(12) United States Patent
Notman

(10) Patent No.: US 8,427,121 B2  
(45) Date of Patent: Apr. 23, 2013

(54) MULTI-OUTPUT DC-DC CONVERTER

(75) Inventor: Andrew Notman, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 451 days.

(21) Appl. No.: 12/671,364

(22) PCT Filed: Jul. 25, 2008

(86) PCT No.: PCT/GB2008/050627
§ 371 (c)(1),
(2), (4) Date: Jan. 29, 2010

(87) PCT Pub. No.: WO2009/016401
PCT Pub. Date: Feb. 5, 2009

(65) Prior Publication Data
US 2010/0194359 A1 Aug. 5, 2010

(30) Foreign Application Priority Data
Jul. 31, 2007 (GB) .................................. 0714878.6

(51) Int. Cl.
*G05F 1/577* (2006.01)
(52) U.S. Cl.
USPC ........................................................ 323/267
(58) Field of Classification Search .................. 323/225, 323/267, 268, 271, 350
See application file for complete search history.

(56) References Cited

U.S. PATENT DOCUMENTS

| | | | |
|---|---|---|---|
| 6,900,620 B2 * | 5/2005 | Nishimori et al. | 323/222 |
| 7,256,568 B2 * | 8/2007 | Lam et al. | 323/222 |
| 7,432,614 B2 * | 10/2008 | Ma et al. | 307/31 |
| 2002/0105307 A1 | 8/2002 | Groeneveld et al. | |
| 2004/0017111 A1 | 1/2004 | May | |
| 2004/0135562 A1 * | 7/2004 | Oden | 323/282 |
| 2005/0105227 A1 | 5/2005 | Chen et al. | |
| 2005/0264271 A1 | 12/2005 | Lam et al. | |
| 2006/0114624 A1 | 6/2006 | Sharma | |
| 2006/0176031 A1 | 8/2006 | Forman et al. | |

FOREIGN PATENT DOCUMENTS

| | | |
|---|---|---|
| GB | 1125868 | 9/1968 |
| GB | 2 441 358 A | 3/2008 |
| JP | 63-144763 A | 6/1988 |

* cited by examiner

*Primary Examiner* — Gary L Laxton
(74) *Attorney, Agent, or Firm* — Dickstein Shapiro LLP

(57) ABSTRACT

A DC-to-DC converter generates multiple outputs from a single input supply using a single inductor. The inductor current can be changed rapidly by connecting the input voltage in either direction across the inductor using switches A to F. In use, current flows from the input supply through the inductor to an output during a charge phase, then current flows from ground through the inductor to the output in a discharge phase. The level of inductor current at the end of the discharge phase is stored. Before the next charge phase for the same output, the input supply is connected across the inductor in a slew phase to bring the inductor current to the stored level. This reduces crosstalk between outputs having different power requirements. Variable frequency noise in the converter is reduced by giving each output the same total time (slew phase+charge phase+discharge phase).

34 Claims, 13 Drawing Sheets

*Marked-Up Extract from Figure 11*

MULTI-OUTPUT DC-DC CONVERTER

The present invention relates to electric power supply circuits of the type in which power, input from a DC supply and not itself generated by the power supply circuit, is used to generate one or more output DC electric power supplies, normally at a different voltage from the input supply and, in the case in which there is more than one output DC power supply, normally at different voltages from each other. The power supply circuits may be used, for example, in portable hand-held (which term includes being carried in a pocket, on a belt clip or otherwise arranged to be carried by a person in normal use) devices and in peripheral devices which receive their power through a connection from another device, for example, a device which receives power over a combined signal and power connection such as a USB connection.

Various designs of circuit are known in which an inductor is connected in an arrangement of switches (which are typically implemented as transistors or as diodes, depending on the circuit requirements), to enable the inductor to be connected to an input terminal which receives the input DC supply and to one or more output terminals to which the output DC power is supplied. Various switching regimes are known. For example, a switching cycle might begin with an inductor charge phase in which one end of the inductor is connected to the input supply and the other end of the inductor is connected to an output terminal at a moment when the inductor current is zero. During this phase, a current would flow from the input supply to the output terminal and current through the inductor would increase. At some point, a control arrangement would control the switching system to change to an inductor discharge phase, in which the first end of the inductor is disconnected from the input supply and connected instead to a ground connection, so that current would continue to flow through the inductor owing to its inductance, and therefore power would continue to be supplied to the output terminal, while the inductor current decreased. When the inductor current reaches zero, the control arrangement would disconnect it from the output terminal. Optionally, there might be a period during which the inductor is disconnected both from the input supply and from all output terminals. Then the inductor is connected to the next output terminal and also to the input DC power supply, and the procedure is repeated in order to supply power to that output terminal. The procedure would be repeated with each output power terminal in turn, and then the cycle would begin again. Either in the power supply circuit, or in the circuitry connected to each output terminal, there would be a capacitance sufficient to provide the necessary smoothing of the voltage at each output terminal, and to provide a current during the periods when the inductor is not connected to the respective output terminal. The control circuitry will include an arrangement for monitoring the difference between the actual voltage at each output terminal and the required voltage at the respective terminal, and this is used to determine when the input power supply is disconnected from the inductor during the operation for providing power to the respective terminal. Accordingly, terminals which are required to supply a relatively high voltage or a relatively high current will typically be connected to the inductor for a longer time during each cycle than a terminal which has to supply a lower current at a lower voltage. This is merely one example of a control regime, and various circuits and associated control regimes are known.

Circuits of this general type are attractive to designers because of their small size and because they can be configured to allow multiple different output voltages to be generated from a single input voltage using only one inductor. Minimizing the number of inductors is attractive because they cannot easily be formed on integrated circuit chips and therefore every inductor normally has to be provided as an off-chip component, with a consequent effect on circuitry volume, assembly costs and integrated circuit pin-out (because pins must be provided for connection to each inductor). However, such circuits are not entirely problem-free. For example, it can be difficult to supply a high current to an output having a voltage only slightly below the input voltage, owing to the low level of the voltage drop across the inductor in the inductor charge phase in such a case. Also, the intermittent connection of the inductor to each output terminal creates noise in each output power supply. If the current load on one output terminal varies, the amount of time that the inductor is connected to that output will need to be varied as a result. If the amount of time given to one particular terminal increases suddenly, this can result in other output terminals being temporarily deprived of sufficient power from the inductor. Additionally, as the time allocated to each output terminal varies, the frequency components in the generated noise will vary. In order to save space, some products include such power supply circuits together with both digital and analog circuits all on a single integrated circuit chip, especially in the case of portable or hand-held audio devices such as personal stereos, MP3 players, etc. However, variable frequency noise can be highly disruptive to analog processing circuits.

Some embodiments of the present invention may help to alleviate at least some of these problems, although it is not essential to the invention to do so.

According to an aspect of the present invention there is provided a method of controlling a DC-to-DC power supply circuit of the kind in which current through an inductor is supplied at different times to different power outputs, in which method the level of current through the inductor, at the time when current from the inductor ceases to be supplied to a particular power output, is stored, and the level of current through the inductor is adjusted, if necessary, before the current is supplied again to the same power output so as to bring the inductor current to be substantially the same as (or within a predefined criterion of) the current through the inductor at the end of the previous period when inductor current was supplied to that output. By making the inductor current at the beginning of a period of power supply the same as (or at least, similar to) the current supplied by the inductor at the end of the previous period of power supply to the same power output, the level of power supplied to one power output can be partially protected from the effect of changes in the power demand at another power output. If the demand at a particular power output changes, the level of current in the inductor at the end of the period for supplying that output is likely to change also. This may affect the time taken to adjust the current in the inductor before beginning to supply power to the next power output. Consequently, the independence of one power output from the effect of changes in demand at another power output is not necessarily complete.

This aspect of the present invention differs from known methods of discontinuous current mode operation because, in the present aspect of the present invention, the inductor current is not necessarily zero at the beginning and end of the period for supplying current to a power output. Instead, the level of inductor current at the end of a period of power supply to a power output is likely to depend on such factors as the voltage to be maintained at the power output, the power demand (and therefore the current drain) at the power output, and the proportion of the total time for which the inductor supplies current to the power output in question. Normally, for the supply of a positive voltage at the power output, the inductor current at the beginning and end of the period of power supply to the power output will be positive. However, circumstances may arise in which the current at the end of a period of power supply (and therefore at the beginning of the next period of power supply to the same power output) is negative, even though the power output has a positive voltage and the inductor current is positive for a part of the period during which power is supplied to the power output.

In another aspect of the present invention, there is provided a DC-to-DC electric power supply circuit, for receiving DC power from an input and providing DC power to at least one output, in which a switching arrangement is provided for an inductor so that current through the inductor can be supplied to the power output (or to each of a plurality of different power outputs at different times) and the switching arrangement is also such that the inductor can be connected between the power input and earth, ground or another fixed voltage either way round without providing current to a regulated power output.

This power supply circuit provides a mechanism for selectively driving the current through the inductor up or down, as desired, by applying the input voltage to the appropriate end of the inductor at a time when the inductor is not supplying current to any regulated power output. This permits a relatively fast slew of the inductor current if, at any particular moment, the current is different from the current required according to the control regime for the circuit.

This aspect of the invention may be useful for implementing the first aspect of the invention, by allowing the inductor current to be changed rapidly from the current level at the end of the period for supplying one power output to the inductor current required for the beginning of the period for supplying another power output.

Embodiments of the present invention, given by way of non-limiting example, will now be discussed with reference to the following drawings.

Figure 1:
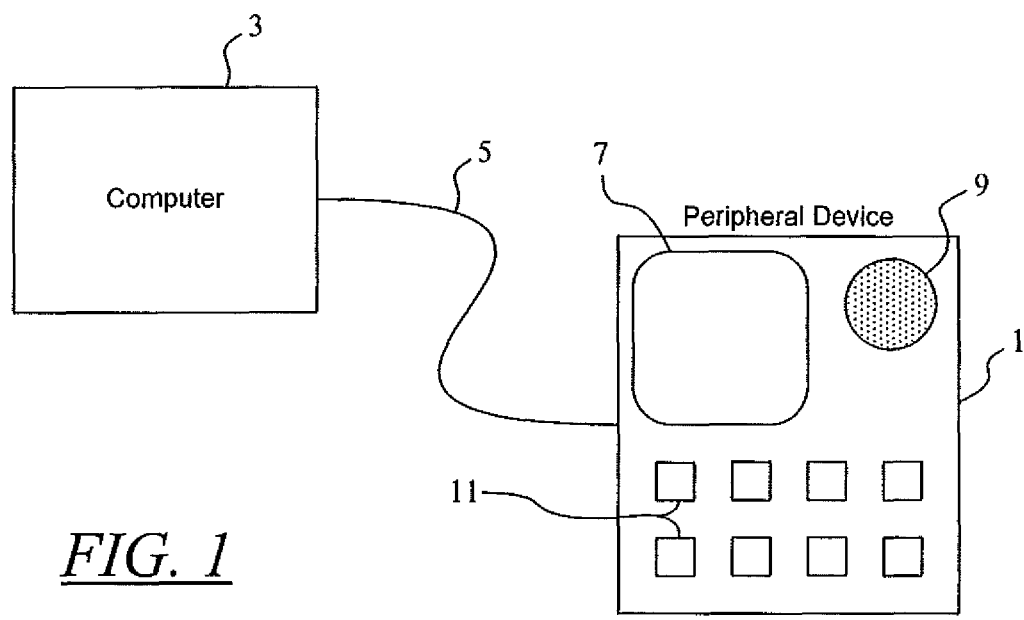
FIG. 1 shows a peripheral device, containing a DC-to-DC converter embodying the present invention, connected to a computer.

FIG. 1 shows a computer peripheral device 1, connected to a computer 3 by a line 5. The connection over the line 5 is of the type which permits signals to be exchanged between the peripheral device 1 and the computer 3, and also provides a small amount of DC power from the computer 3 to the peripheral device 1. For example, it may be a USB (Universal Serial Bus) connection. As shown in FIG. 1, the peripheral device 1 has a display screen 7, a speaker 9 to allow audio output, and keys 11 to allow input by a user. Many kinds of peripheral device are known, and the peripheral device 1 may have different input and output means from those shown in FIG. 1, or may have only input means or only output means.

Although some known peripheral devices have their own independent power supply, in the form of a battery or a connection to receive mains electricity, the peripheral device 1 of FIG. 1 operates using power received from the computer 3 over the connection line 5. However, the circuitry and other components within a peripheral device may require an electric supply having a different voltage from the voltage supplied over the connection line 5. Additionally, different components within the peripheral device 1 may require different electric supply voltages from each other. This is particularly likely to be the case if the peripheral device both provides an audio output and additionally either provides a visual display output or receives a non-audio input through keys or the like, as in the case of the peripheral device 1 shown in FIG. 1. In order to meet these power supply requirements while obtaining all external power from the connection line 5, the peripheral device 1 contains a DC-to-DC electric power converter. This uses the power received from the connection line 5 to generate one or more power supplies at the voltage or voltages required by the various components in the peripheral device 1.

Figure 2:
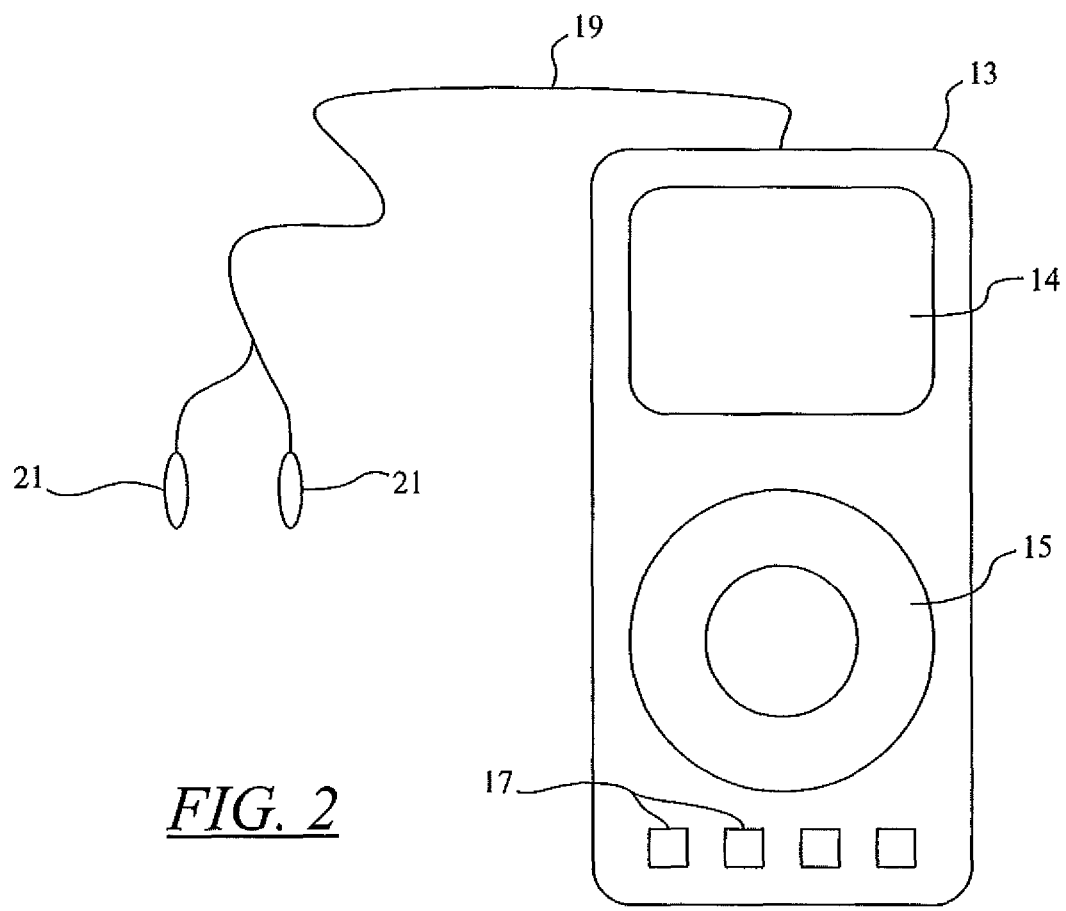
FIG. 2 shows a portable hand-held audio device containing a DC-to-DC converter embodying the present invention.

FIG. 2 shows a hand-held (which term is intended to cover devices which may be carried in pockets, attached to clothing or otherwise mounted on a user's body) portable audio device 13, such as an MP3 player. The audio device 13 has a display 14, and also has user input controls in the form of a control ring 15 and keys 17. The audio device 13 is arranged to provide an audio output signal to connection lines 19 (which may be detachable or may be permanently attached) leading to earphones 21. The audio device 13 is powered by a removable internal battery.

As with the peripheral device 1 of FIG. 1, the audio device 13 contains different components which require different electrical supply voltages. Typically, it will contain digital control circuits and memory devices which respond to user inputs via the control ring 15 and keys 17, and analog circuits for processing audio signals and outputting them to the connection line 19, and the analog circuits will typically require a different electric supply voltage from the digital circuits.

The devices of FIGS. 1 and 2 are merely examples of devices in which embodiments of the present invention may be useful, and many other types of device are possible. For example, a disposable device may have a non-removable battery. A device may have an internal battery that is rechargeable by intermittent connection to an external power supply. A device may have another power source, such as a solar cell, instead of or in addition to the power sources discussed above.

Figure 3:
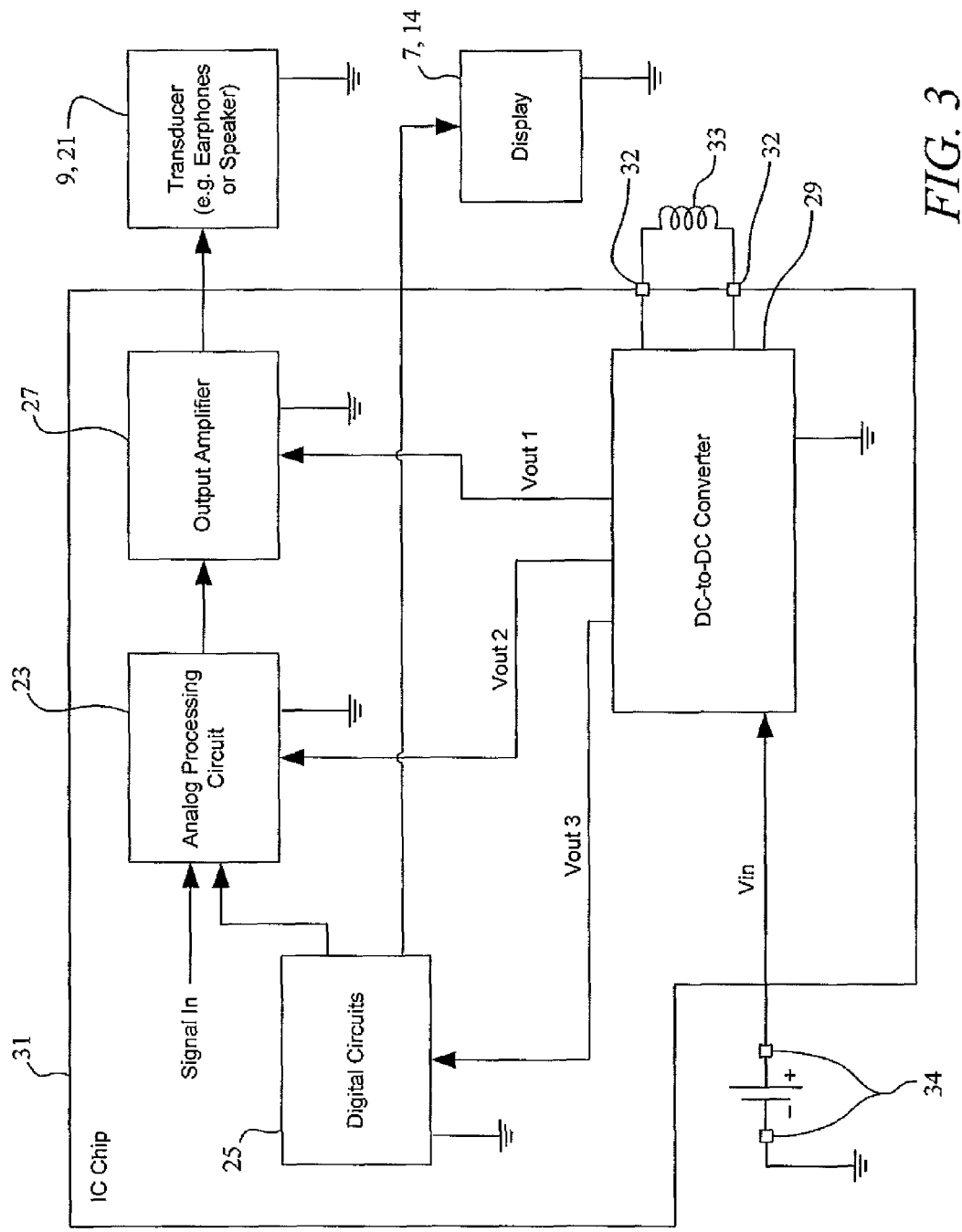
FIG. 3 is a schematic block diagram of some of the circuits in a device such as the peripheral device of FIG. 1 or the audio device of FIG. 2.

FIG. 3 is a block diagram of part of the circuitry which might typically be found in the peripheral device 1 of FIG. 1 or the audio device 13 of FIG. 2. An analog processing circuit 23 processes received analog signals such as audio signals under the control of control signals received from digital circuits 25. The analog processing circuit 23 outputs an audio signal for supply to a transducer such as the speaker 9 in FIG. 1 or the earphones 21 in FIG. 2. This audio signal is amplified by an output amplifier 27 before being provided to the transducer 9 or 21. The digital circuits 25 also drive the display 7 or 14. Typically, the analog processing circuit 23 will require a higher voltage power supply than the digital circuits 25. Additionally, the output amplifier 27 requires a still higher voltage. These three voltages are all supplied from a DC-to-DC converter 29. In order to reduce manufacturing cost and save space, the digital circuits 25, analog circuits 23, 27 and the DC-to-DC converter 29 are all provided on a common integrated circuit chip 31, which may also contain further circuitry not shown in FIG. 3. Since it is difficult to form an inductor of a sufficiently useful size on an integrated circuit chip, an inductor 33 of the DC-to-DC converter 29 is provided as a separate component, connected to the remainder of the DC-to-DC converter 29 via connection pins 32 of the IC chip 31.

The audio signal input to the analog processing circuit 23 may be received from outside the device or may be read from a memory either on or off the integrated circuit chip 31. The analog audio signal may be provided from a digital-to-analog converter in the case that the audio signal is initially provided in digital form. Typically, the digital circuits 25 will respond to inputs from the keys or other user controls 11, 15, 17 to select the audio signal to be input to the analog processing 23 and to provide control signals such as a volume control to the analog processing circuit 23.

The DC-to-DC converter 29 generates three power outputs at respective voltages Vout1, Vout2 and Vout3 from a single input voltage Vin, which is received from a voltage source off the IC chip 31. In FIG. 3, the external voltage supply is shown as a battery, but it may also be an alternative DC voltage supply such as the power supplied over the connection line 5 in FIG. 1. The battery (or other DC voltage supply) is connected via terminals 34.

Figure 4:
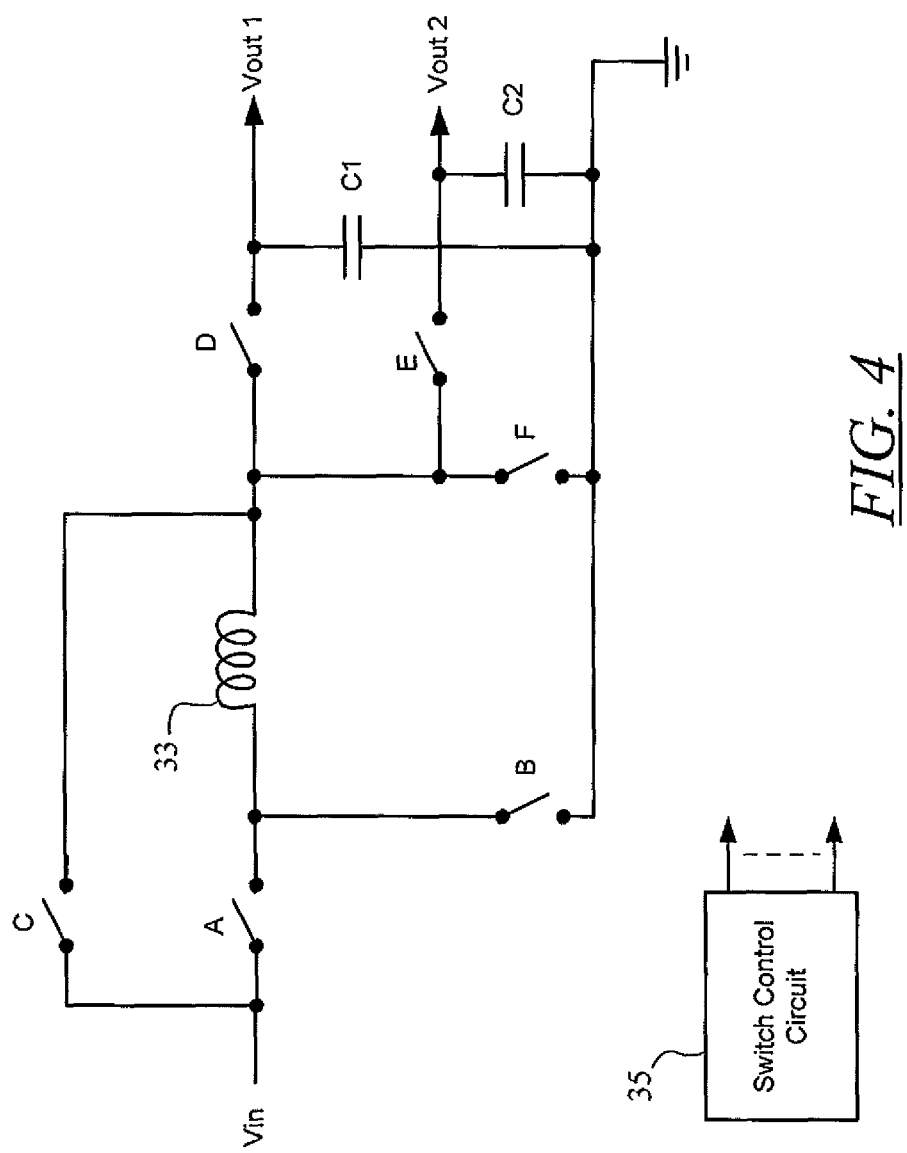
FIG. 4 is a circuit diagram of the power conversion circuitry of a DC-to-DC converter embodying the present invention.

FIG. 4 is a circuit diagram of the power conversion circuit of a DC-to-DC converter such as the converter 29 of FIG. 3. For simplicity of explanation, the circuit of FIG. 4 provides two power outputs from a single power input. Modification of the circuit, in order to provide further power outputs, will be explained later.

In the circuit of FIG. 4, an inductor 33 is connected to a switching arrangement having switches A, B, C, D, E and F. Typically, the switches A to F will be provided as MOS transistors. As noted above, the inductor 33 cannot easily be formed on the integrated circuit chip 31 and therefore is provided as a separate component. It is preferable to generate all of the power outputs using a single inductor, in order to minimize the number of external components that have to be connected to the IC chip 31.

Switches A and C allow the input voltage Vin to be connected to either end of the inductor 33. Switches B and F allow either end of the inductor 33 to be connected to earth or to the ground line of the IC chip 31. Switches D and E connect one end of the inductor 33 to selective ones of the power outputs, to provide output voltages Vout1 and Vout2. Each power output also has a respective capacitor C1 or C2, which supplies current to the respective power output while the output is not connected to the inductor 33. The capacitor is recharged during the time periods when the respective power output receives current from the inductor 33. The capacitors C1 and C2 also serve to reduce voltage fluctuations (ripple) caused by the intermittent supply of current from the inductor 33. The switches A to F are opened and closed by switch control signals received from a switch control circuit 35, which will be described later.

During operation of the DC-to-DC converter, the switch control circuit 35 passes through a series of operational phases. In each phase, two of the switches A to F are closed and the remaining switches are open. In the drawings and the remainder of this description, the phases are identified by the switches which are closed in each respective phase. The switch patterns and the path of the current $I_L$ through the inductor 33 for each phase are shown in FIGS. 5 to 10.

Figure 5:
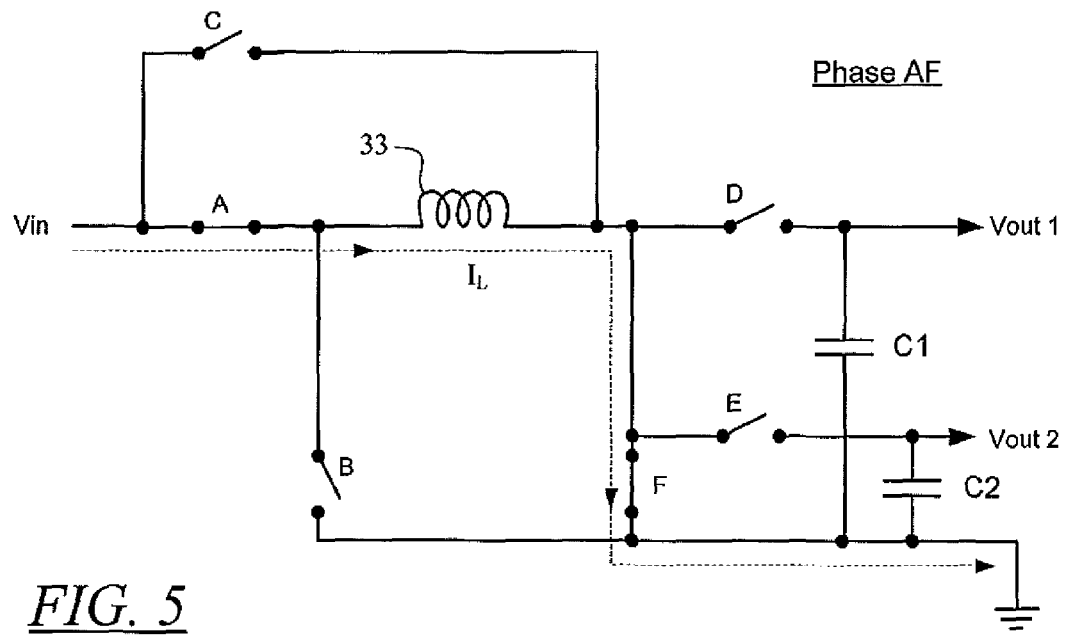
FIGS. 5 to 10 show the switch positions and the path of current through the inductor of the power conversion circuitry of FIG. 4 in six respective phases of operation.

FIG. 5 shows phase AF. Switches A and F are closed. The left-hand end of inductor 33 is connected to the input voltage Vin, and the right-hand end of inductor 33 is connected to ground. Accordingly, the entire input voltage is connected across the inductor 33. This phase is used for increasing the forward current through the inductor 33 as quickly as possible. Because the purpose of this phase is a rapid change in inductor current, it is referred to as a slew phase.

Figure 6:
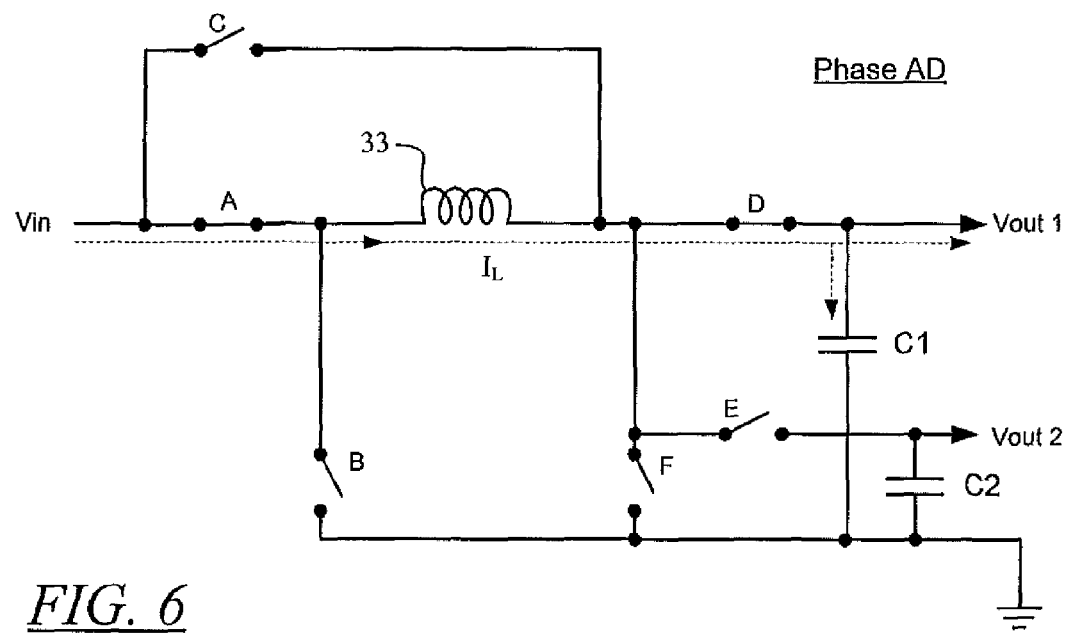

FIG. 6 shows phase AD. In this phase, switches A and D are closed so that the left-hand end of inductor 33 is connected to input voltage Vin and the right-hand end of inductor 33 is connected to the first power output, which is at voltage Vout1. Since Vin is higher than Vout1, the forward inductor current will increase during this phase, but it will increase more slowly than during phase AF. Because switch D is closed, the inductor current $I_L$ is supplied to the first power output, and additionally charges the associated capacitor C1. This is referred to as an inductor charge phase.

Figure 7:
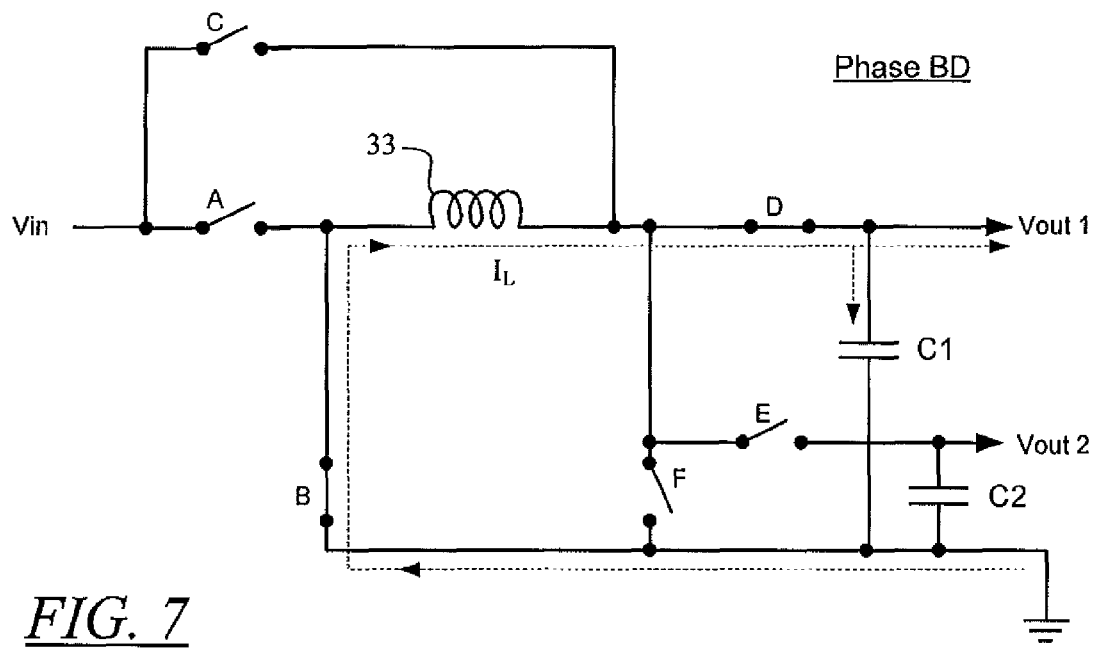

FIG. 7 shows phase BD. This phase always follows phase AD (FIG. 6). In this phase, switch D remains closed connecting the right-hand side of the inductor 33 to the first power output. However, switch A is now open and switch B is closed, so that the left-hand end of inductor 33 is connected to ground. Since there is positive current flow through the inductor 33 when this phase begins, current continues to flow to the first power output and into capacitor C1. However, because voltage Vout1 is higher than ground, the inductor current $I_L$ falls during this phase. If the phase is maintained for long enough, the inductor current may fall to zero and then reverse (i.e. the forward current becomes negative). This is referred to as an inductor discharge phase.

Figure 8:
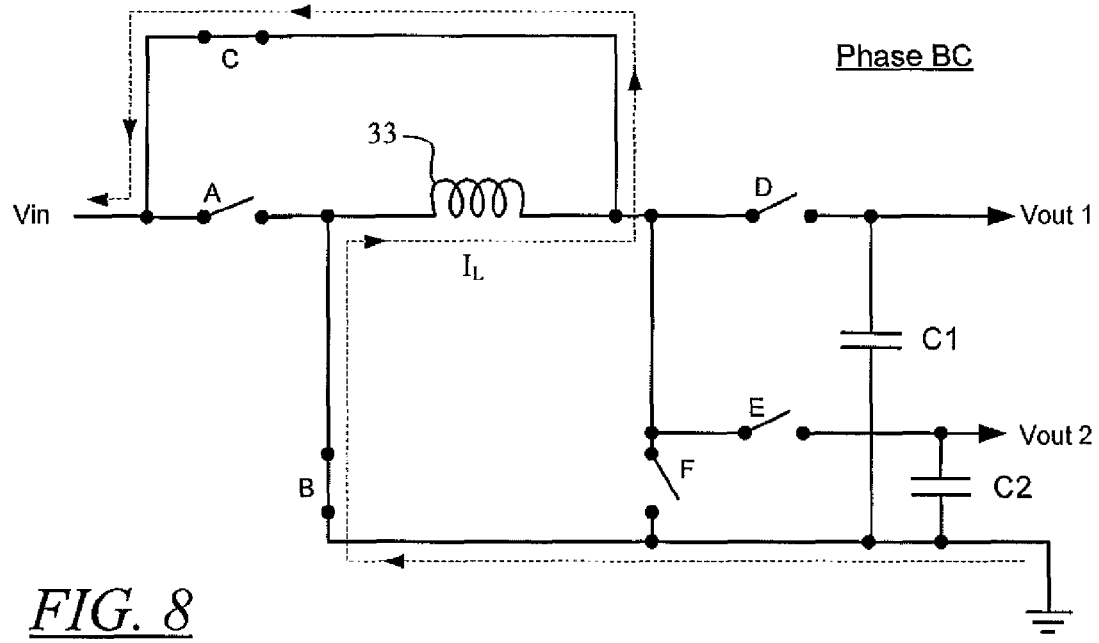

FIG. 8 shows phase BC. In this phase, switches B and C are closed so that the input voltage Vin is connected to the right-hand end of the inductor 33 and ground is connected to the left-hand end of inductor 33. As in phase AF (FIG. 5), the entire input voltage Vin is connected across the inductor 33, but in the opposite direction. Accordingly, this is also a slew phase, and is used for reducing the forward current through the inductor 33 as quickly as possible. As with phase BD (FIG. 7), if this phase is maintained for long enough the inductor current $I_L$ may reverse, so that the forward current becomes negative. Accordingly, phase AF (FIG. 5) can be regarded as a forward or positive slew phase and phase BC (FIG. 8) can be regarded as a reverse or negative slew phase.

Figure 9:
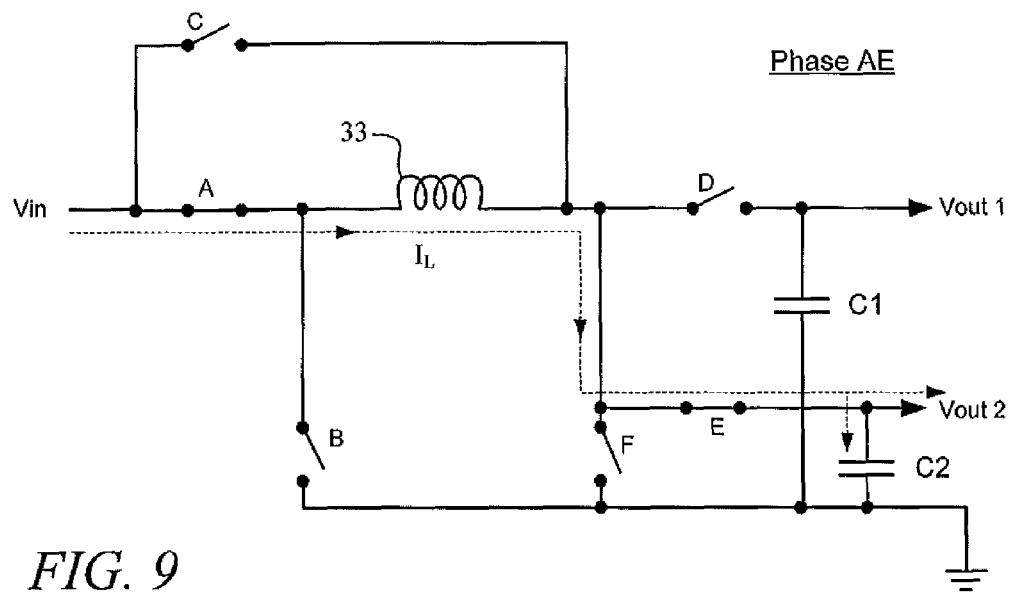
Figure 10:
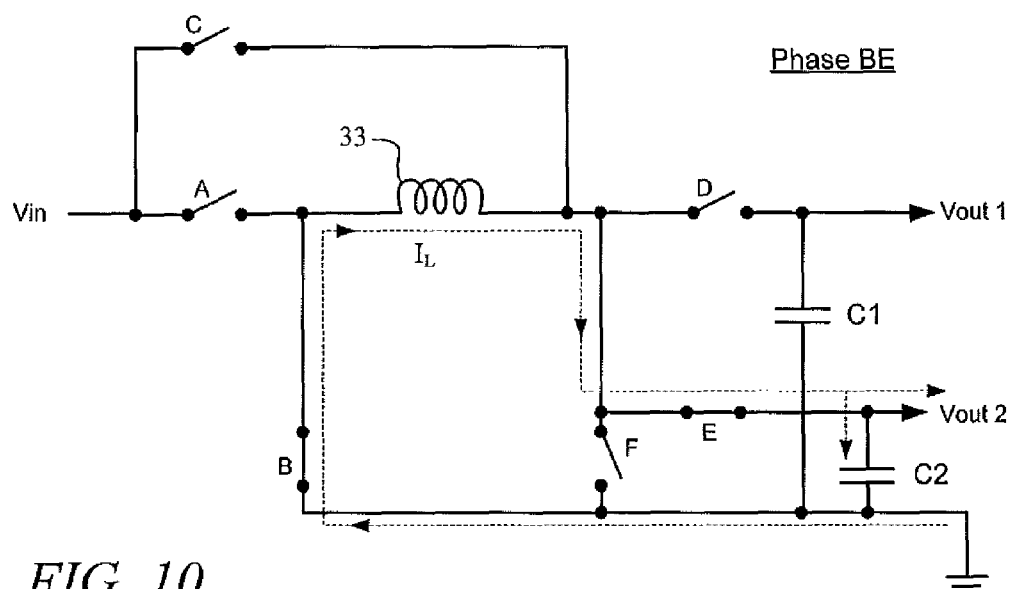

FIGS. 9 and 10 show phases AE and BE respectively. These are inductor charge and inductor discharge phases respectively, and correspond to phases AD and BD of FIGS. 6 and 7 respectively, except that switch E is closed instead of switch D, so that these phases are used for supplying current to the second output terminal and for charging the associated capacitor C2.

Figure 11:
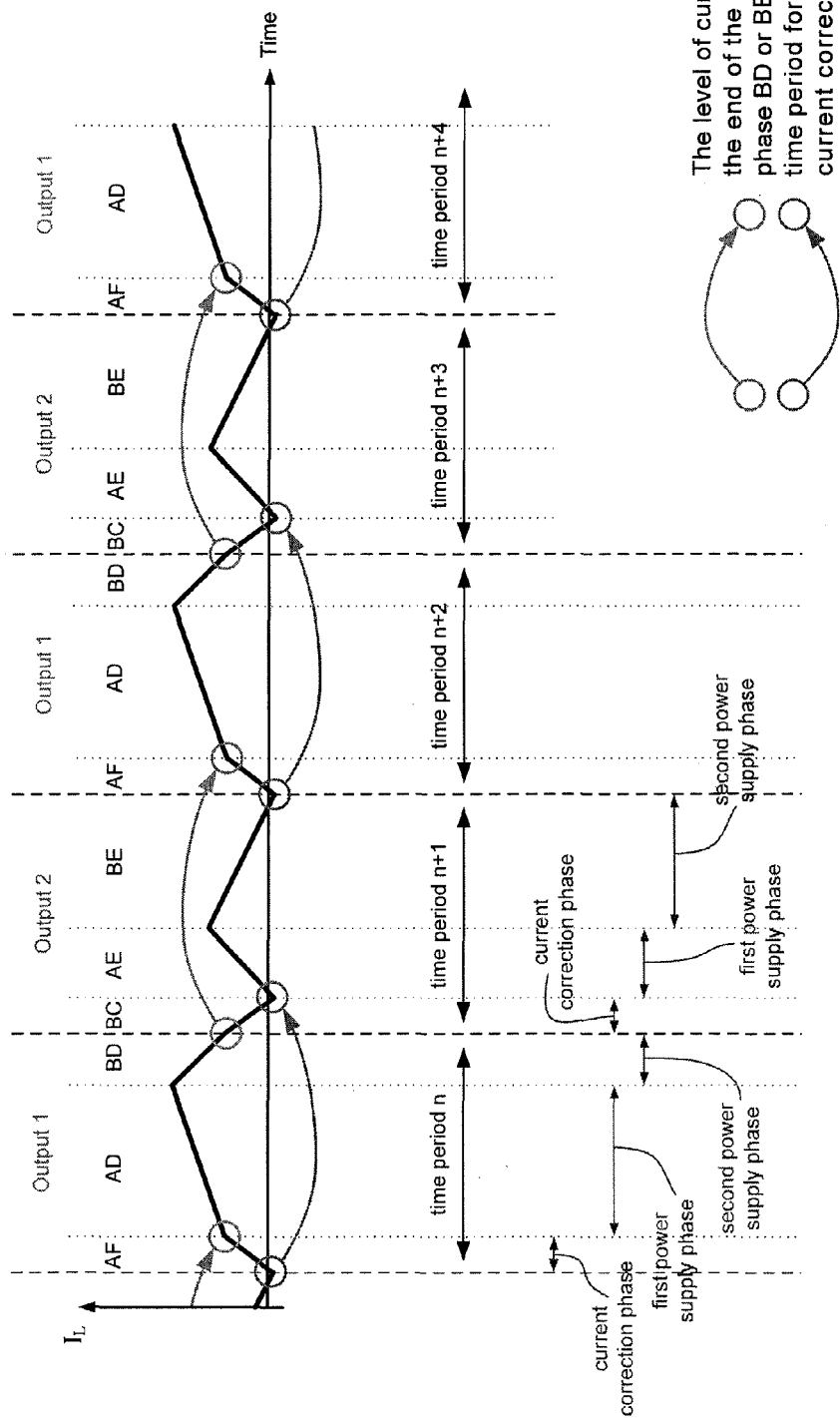
FIG. 11 shows the waveforms of the inductor current and the current flowing into the capacitor at each respective output during an example of steady state operation of the circuitry of FIG. 4.

FIG. 11 shows an example of how the inductor current $I_L$, the current $I_{C1}$ into capacitor C1 and the current $I_{C2}$ into capacitor C2 vary with time when the converter of FIG. 4 is operating in a steady state. In this example, voltage Vout1 provided at the first power output is higher than voltage Vout2 provided at the second power output, and the first power output also has a greater overall power demand than the second power output.

In an operation cycle, the switch control circuit 35 alternates between supplying power to output 1 and to output 2. Even though output 1 has a greater power demand than output 2, the period of time allocated to each output in the operation cycle is the same, and this period is not altered by changes in the power demand at either of the outputs. In the time period allocated to a particular output, the converter will pass through three phases.

First, there will be a slew phase in which the inductor current $I_L$ is driven to the required level for the start of the supply of current to the output. This will either be the forward slew phase AF or the reverse slew phase BC depending on whether the inductor current needs to be increased or decreased.

When the inductor current reaches the correct value, the slew phase terminates and the inductor charge phase AD or AE (depending on whether output 1 or output 2 is being supplied) begins. In this phase, current is supplied to the output while the inductor 33 is connected to the input voltage Vin, so that the inductor current increases. The current drawn by each output is assumed to be constant. Therefore, as the current supplied from the inductor 33 to the output increases, the current flowing into the respective capacitor C1 or C2 increases. This phase continues until the inductor current reaches a level determined by the voltage regulation system in the switch control circuit 35, as will be explained later.

Once the required inductor current is reached, the switch control circuit 35 changes to the inductor discharge phase BD or BE, in which current continues to be supplied from the inductor 33 to the relevant power output and its associated capacitor, but the left-hand end of the inductor 33 is now connected to ground rather than to Vin, and therefore the inductor current $I_L$ falls. This phase is continued until the end of the fixed time period allocated to the respective power output. Then the period for the next power output begins, starting with the appropriate slew phase.

The level of the inductor current $I_L$ at the end of the period allocated to an output (i.e. at the end of the inductor discharge phase BD or BE) is sampled and stored, and this is the current level which is required in the inductor 33 when current supply to the same output starts again. Therefore the current level sampled at the end of a period for output 1 is used to terminate a slew phase and begin an inductor charge phase in the next time period for output 1. Similarly, the current level sampled at the end of the period for current supply to output 2 is used to terminate the slew phase during the next period for current supply to output 2.

Except during the phases in which current from the inductor 33 is being supplied to the relevant power output, the current drawn by the power output is supplied from the respective capacitor C1 or C2. Since current is flowing out of the capacitor, the capacitor currents $I_{C1}$ and $I_{C2}$ are shown as negative in FIG. 11 during these phases. At the end of a slew phase, the inductor 33 is connected to one of the power outputs. At this point, the corresponding capacitor current switches to follow the inductor current. Unless the inductor current $I_L$ is zero at the end of the slew phase, there will be an abrupt change in the relevant capacitor current at this moment. While the inductor 33 is connected to the output, the current flowing into the capacitor will always be less than the current flowing through the inductor 33 by an amount equal to the current supplied to the corresponding power output.

In the example shown in FIG. 11, voltage Vout1 is higher than voltage Vout2. Therefore the voltage across the inductor 33 is less, and the current $I_L$ through the inductor rises more slowly, in phase AD than in phase AE. For the same reason, the current falls more steeply during phase BD than during phase BE. These differences in the rate of change of the inductor current affect the relative length of time for each phase. The magnitude of the voltage across the inductor 33 is substantially the same for the forward and reverse slew phases AF and BC. Furthermore, since FIG. 11 shows a steady state, the change in inductor voltage required in each slew phase is the same. Consequently, the time taken by each slew phase is the same in FIG. 11. The time taken for each slew phase depends on the difference between the current value for the beginning and end of supply to one output and the current value for the beginning and end of supply to the other. The more similar these currents are to each other, the shorter each slew phase becomes. In principle, if the voltages Vout1 and Vout2 and the respective current demands at each output are such that the initial and final inductor currents are the same for each output, the slew phases could disappear altogether (i.e. they could have a zero duration).

Since output 2 needs to receive less power during each operation cycle in output 1, but output 2 nevertheless receives inductor current for the same length of time as output 1, the current at the beginning of the inductor charge phase and at the end of the inductor discharge phase for output 2 and also the peak current at the end of the inductor charge phase for output 2 are lower than the corresponding currents for output 1. As is shown in FIG. 11, in the case where only a small amount of power is required by an output, the initial and final inductor current for that output may in fact be negative.

In the example shown in FIG. 11, the voltage Vout1 at power output 1 is only slightly below the input voltage Vin, and so the inductor current $I_L$ only rises slowly during the inductor charge phase AD. However, actual level of current during the inductor charge phase AD is relatively high, because a substantial forward current in the inductor 33 has been built up during the preceding slew phase AF. This allows the circuit to supply a high current to power output 1 even though it has a relatively high voltage. The level of current in the inductor rises rapidly during the slew phase because substantially the whole of Vin is dropped across the inductor 33 and not just the difference between Vin and Vout1. The rate of current growth in the inductor during the slew phase is independent of the level of Vout1.

Because each output is allocated the same length of time in the operation cycle of the switch control circuit 35, switch noise and other noise associated with the change in the output tends to occur at a fixed frequency. This is advantageous for the operation of the analog circuits provided on the same integrated circuit chip 31 as the DC-to-DC converter, or off-chip analog circuits receiving power from the DC-to-DC converter, since it is generally easier to protect analog circuitry against fixed frequency noise than to protect it against variable frequency noise. The use of slew phases AF and BC means that the current at which power begins to be supplied to an output depends on the current being supplied to that output at the end of the previous period of supplying that same output, and not the current at the end of the period for supplying the other output. This makes it easier to supply power to two or more power outputs which require substantially different voltages and levels of power. Additionally, it helps to reduce the effect on one power output of changes in the level of demand at the other power output (i.e., reduces crosstalk between the outputs).

If the current drawn at power output 1 increases, so that the amount of power supplied to the output must increase, the regulation system will increase the level of the inductor current at which inductor charge phase AD ends and inductor discharge phase BD begins. This in turn will result in an increase in the current at the end of phase BD, and therefore a correspondingly higher current at the beginning of the next phase AD, in the time period for supply of current to output 1. Thus the overall level of current supplied to output 1 increases, with the result that more power is supplied. However, because the current level at the beginning of phase AD and the end of phase BD has increased, a greater change in inductor current is required during each slew phase, and therefore the time taken by the slew phases AF and BC increases. This reduces the amount of time available for supplying current to each output. As the time required by each slew phase increases, less and less time is available to supply current to the outputs, until finally it is not possible to supply enough power to the output with the highest power demand. This is typically the way in which increasing output current demand ultimately leads to a failure of voltage regulation at one of the outputs of the DC-to-DC converter. It may be noted that the difference between current demands at different outputs (reflected in the length of the slew phases) contributes to failure, and not just the magnitude of the highest power demand.

The effect of a change in the level of demand in an output will be discussed in more detail with reference to FIG. 12.

The level of current in the inductor 33 at the end of the period for supplying current to output 1 is sampled and held, and this value is used as the level of inductor current at which the slew period ends in the next period for supplying output 1. This level is shown as SH1 in FIG. 12. Having been sampled at the end of phase BD, the level of SH1 remains constant until it is re-sampled at the end of the next occurrence of phase BD. Similarly, level SH2 in FIG. 12 is the sampled-and-held value of the inductor current at the end of phase BE, when the period for supply of current to output 2 ends. FIG. 12 shows several cycles of operation of the power converter, labelled cycle N, cycle N+1, etc. Initially, in cycle N, both outputs are in steady state. At the end of the period for output 1 in cycle N, the inductor current has returned to the pre-existing level of SH1, and so the re-sampled level of SH1 is the same as the previous level. Similarly, at the end of the period for output 2 in cycle N, the inductor current has returned to the pre-existing level for SH2, and the re-sampled level of SH2 is the same as the previous level.

Current demand at output 1 now increases. At the beginning of the period for output 1 in cycle N+1, level SH1 remains unchanged and phase AD begins at the same level of inductor current $I_L$ in cycle N+1 as it did in cycle N. However, owing to the increased current demand, the peak value for the inductor current $I_L$, used to switch operation from phase AD to phase BD, has increased. Accordingly, in cycle N+1 phase AD continues for longer than it did in cycle N. Phase BD therefore starts with a higher level of inductor current, and also extends for less time, with the result that when the period for output 1 ends, and phase BD is terminated, the inductor current is still above the previous level for SH1. At this point, SH1 is re-sampled and the new, higher value is held.

At the beginning of the period for output 2 in cycle N+1 the inductor current is at the new, higher level for SH1, and therefore the slew period BC has to last for longer in order to reach the required current level SH2 compared with period BC in cycle N. There has been no change in demand at output 2, and so phase AE continues until it reaches the same current level for switching to phase BE as was used in cycle N. Therefore phase AE lasts for the same length of time in cycle N+1 as it did in cycle N. However, because phase BC lasted for longer in cycle N+1, phase AE started later, and therefore ends later. Consequently there is less time available for phase BE before the end of the period allowed for output 2. Accordingly, when phase BE is terminated the inductor current $I_L$ has not yet fallen to the previous level for SH2. SH2 is now re-sampled and its new, higher level is held.

As compared with cycle N, the supply of current to output 2 in cycle N+1 began at the same current level and peaked at the same current level, but was terminated before the current had reached the same level as at the end of phase BE in cycle N. Consequently, the total amount of charge supplied to output 2 in cycle N+1 is slightly incorrect. However, because the part of the current supply to output 2 which is missing in cycle N+1, as compared with cycle N, is at the end of phase BE where the inductor current $I_L$ is low, the error in the amount of charge supplied is small.

At the beginning of cycle N+2 the slew phase AF continues until the inductor current has reached the new, higher level of SH1. In the meantime, the voltage regulation circuitry has made a slight further increase to the level of current at which phase AD will terminate. However, because the inductor current rises faster during the slew phase AF than during phase AD, the current reaches the required level, and phase AD is terminated, slightly sooner in cycle N+2 than it was in cycle N+1. Therefore phase BD lasts for longer, and even though it starts at a slightly higher current than in cycle N+1 it ends at a slightly lower current, and a new, slightly lower value for SH1 is sampled and held.

At the beginning of the period for output 2 in cycle N+2 the inductor current is slightly lower than at the corresponding point in cycle N+1, and the required level of current SH2 is slightly higher. Consequently, the slew phase BC takes less long in cycle N+2 than in cycle N+1. In the present example it is assumed that the slight error in the amount of power supplied to output to cycle N+1 has not been sufficient to cause any response in the voltage regulation circuitry for output 2, so that phase AE ends at the same level of inductor current as in cycles N and N+1. Therefore phase AE lasts for the same length of time, and phase BE lasts for slightly longer than in cycle N+1 but less long than in cycle N. Therefore the level of inductor current reached at the end of phase BE, and sampled-and-held as the new value of SH2, is between the two previous values for SH2.

Figure 12:
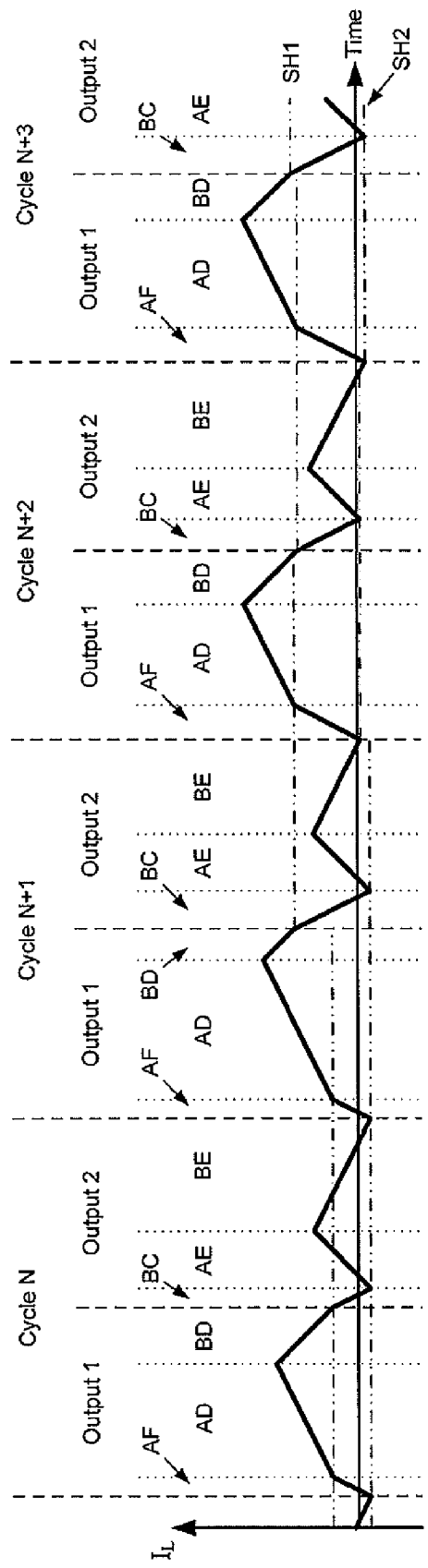
FIG. 12 shows an example of the waveform of the current in the inductor in response to a change in the level of current demand at output 1 in the circuitry of FIG. 4.

As can be seen from FIG. 12, when the system is in steady state the difference between the sample-and-hold current level for an output and the peak current level for the output is such that the increase in current during the inductor charge phase AD or AE is matched by the decrease in current during the inductor discharge phase BD or BE. The voltage regulation circuitry responds to a change in demand at an output by raising or lowering the level of the current peak at which the inductor charge phase ends and the inductor discharge phase begins. This changes the time taken to reach the peak current and therefore changes the length of time available for the inductor discharge phase BD or BE. As a consequence, the sampled-and-held inductor current also changes, in the same direction as the change to the peak current, so that when current is supplied to the same output in the next cycle the slew phase ends and current supply begins at a level which tends to shorten the time for the current supply phase that had lengthened and lengthen the time for the current supply phase that had shortened. The change in the sampled-and-held value creates crosstalk, because it results in a change in the time required for the slew phase in the time period for the other output. However, because the inductor current changes relatively fast during the slew phase (because the inductor 33 is connected between the input voltage and ground) a large change in the sampled-and-held value for one output causes only a small change in the time for the slew phase, and therefore only a small change in the sampled-and-held value, for the other output. Accordingly, it can be seen that crosstalk between the outputs is low. For example, for 5V input, 3V and 1V output at 0.347 A and 0.12 A respectively, the open-loop output cross-regulation figures are as follows:

With loop 2 error voltage held constant, a 67.424 mA shift in the load current of channel 1 gives a 1.243 mA shift in the output of channel 2; with loop 1 error voltage held constant, a 44.316 mA shift in the load current of channel 2 gives a −4.66 mA shift in the load current of channel 1.

If cumulative slight errors in the amount of power supplied to output 2 in FIG. 12 result in a gradual change in the voltage Vout2 at the output, the voltage regulation circuitry will make a slight change to the peak inductor current for output 2, at which phase AE switches to phase BE. This change in the control operations for output 2 will have negligible effect on output 1 owing to the low level of crosstalk between the outputs.

Theoretically, if the voltage regulation circuitry makes a sudden large step change in the peak current that ends the inductor charge phase for an output which supplies power at a voltage only slightly below Vin, an instability can arise in the operation of the converter. In practice, such a step change tends not to happen, and the current level required at the end of the inductor charge phase increases gradually over a number of cycles in response to a change in current demand at a power output. Even if there is a large step change in current demand, this will result in a steady gradual change in the voltage across capacitor C1 or C2 rather than a sudden step change in voltage. Therefore the error at the input to the voltage regulation circuitry rises over a period of time rather than rising suddenly. If necessary, signal filtering within the voltage regulation circuitry can also ensure that it changes the required peak current level at the end of the inductor charge phase gradually, even if it receives a sudden change in the input voltage error. Such filtering is provided in the voltage regulation circuitry of the present embodiment, which will be described later with reference to FIG. 15.

Figure 13:
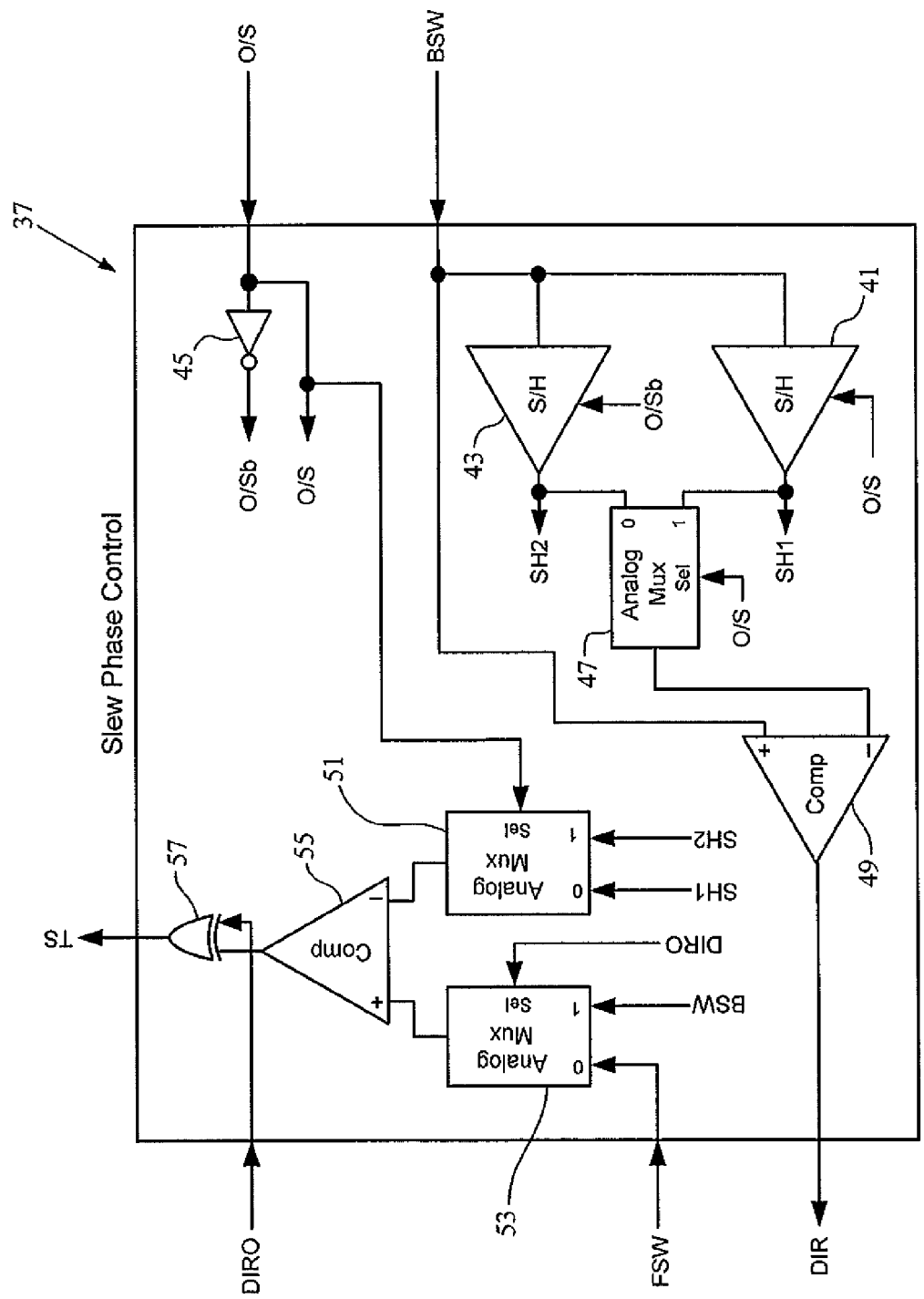
FIG. 13 is a block diagram of the slew phase control unit in the switch control circuit of FIG. 4.
Figure 14:
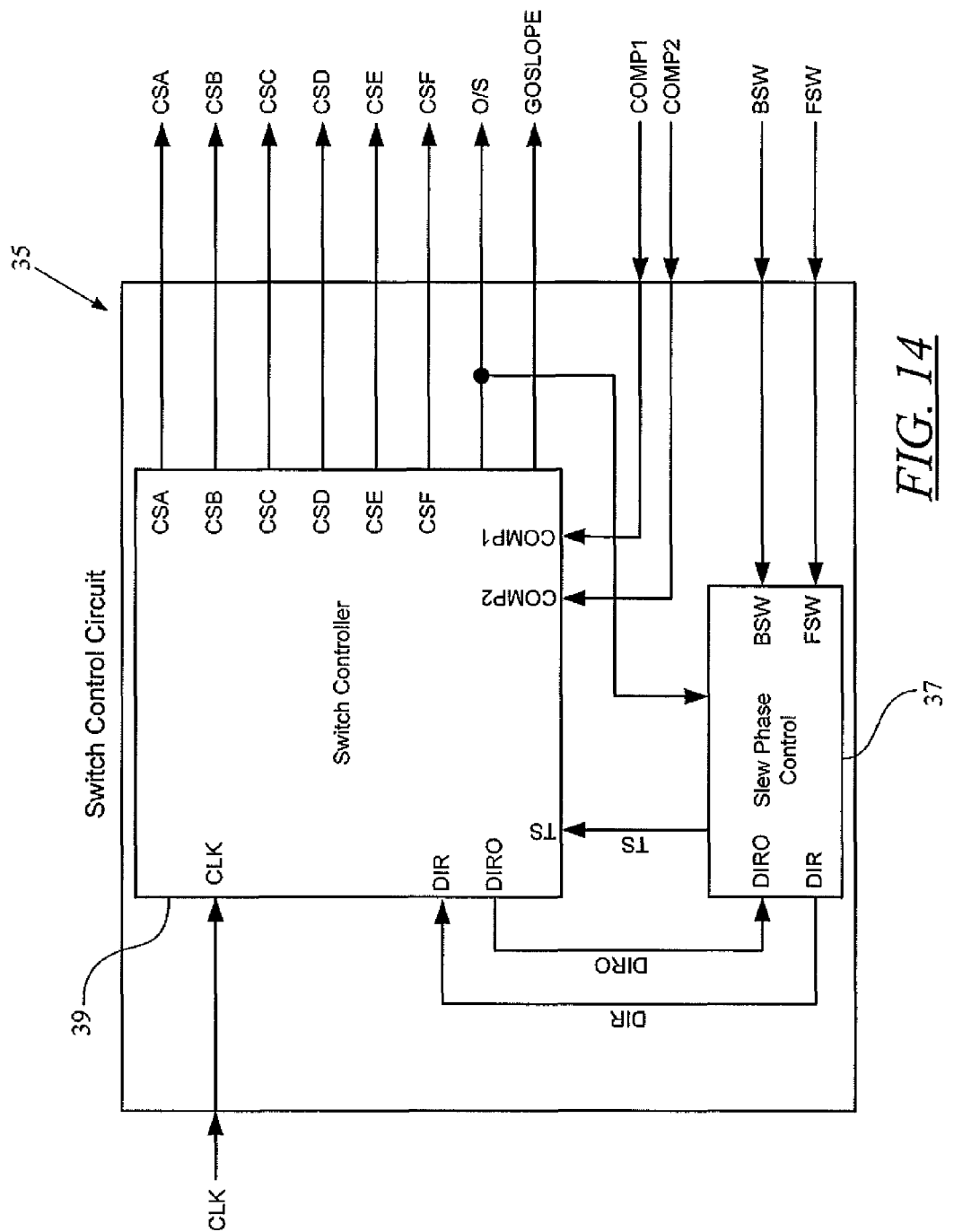
FIG. 14 is a block diagram of the switch control circuit of FIG. 4.

The control circuitry for the DC-to-DC converter of FIG. 4 will now be described with reference to FIGS. 13, 14 and 15. FIG. 13 shows a slew phase control unit 37, which forms part of the switch control circuit 35. As shown in FIG. 14, the switch control circuit 35 comprises the slew phase control unit 37 and a switch controller 39. The slew phase control unit 37 provides signals to the switch controller 39 informing it which way the current in the inductor 33 should change during a slew phase (i.e., whether the slew phase should be phase AF or phase BC), and informing the switch controller 39 when the slew phase should be terminated and the inductor charge phase should be initiated, to supply current from the inductor 33 to the relevant power output. The switch control circuit of FIG. 14 outputs switch control signals CSA to CSF, which open and close switches A to F respectively in the circuit of FIG. 4. The switch control circuit 35 generates the switch control signals CSA to CSF in response to a clock input CLK, which times the period allocated to each power output in the operating cycle of the converter, and inputs from the monitoring circuitry shown in FIG. 15.

Figure 15:
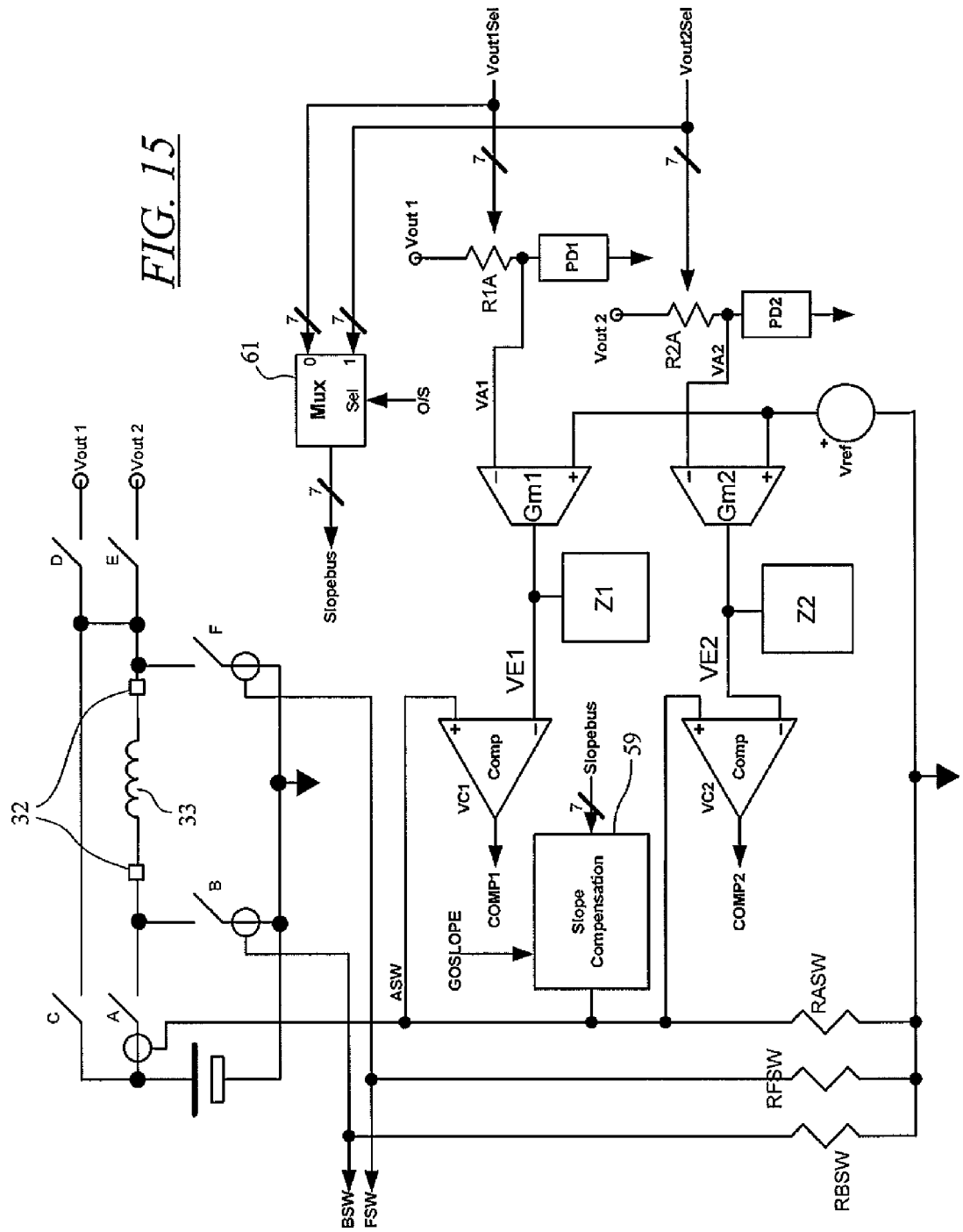
FIG. 15 is a block diagram of current monitoring circuitry and voltage regulation circuitry for a DC-to-DC converter using the power conversion circuitry of FIG. 4.

At the top of FIG. 15 the arrangement of the inductor 33 and switches A to F is reproduced. As shown in FIG. 15, means are provided for monitoring the current flow through each of switches A, B and F. The current is monitored using a scaled version of the respective switch in a feedback loop and driving the current through the scaled switch until the drain voltages of both the main switch and the scaled switch are the same. Each monitoring means provides a current which follows (at a much lower magnitude) the current flowing through the respective switch. These currents are passed through respective resistors RASW, RBSW, RFSW in FIG. 15 to provide respective voltage signals ASW, BSW and FSW. Signal ASW, representing the current in switch A, is used in the voltage regulation circuitry shown in FIG. 15, which will be described later. Signals BSW and FSW, representing the currents in switches B and F, are passed to the switch control circuit 35, where they are input to the slew phase control unit 37 as shown in FIG. 14.

The operation of the slew phase control unit will now be described with reference to FIG. 13. In the operation cycle of the DC-to-DC converter, the period for each power output ends with an inductor discharge phase in which current from the inductor 33 is provided to the output while the left-hand end of inductor 33 is connected to ground through switch B (i.e. phase BD or phase BE). Therefore the current in switch B at the end of a period for a power output is equal to the current in the inductor 33 which needs to be sampled-and-held as level SH1 or SH2, discussed above with reference to FIG. 12. Accordingly, in the slew phase control unit of FIG. 13 signal BSW is input to first and second respective sample-and-hold circuits 41, 43. In response to the clock signal CLK, the switch controller 39 of FIG. 14 generates an output select signal O/S, which indicates which power output is currently selected. The signal is low during the part of each operation cycle in which output 1 is selected, and is high during the part in which output 2 is selected. Output select signal O/S is provided to the slew phase control unit 37, where it is inverted by an inverter 45 so as to generate signal O/Sb. Signal O/S is provided to the latch input of S/H circuit 41 and signal O/Sb is provided to the latch input of S/H circuit 43, so that S/H circuit 41 conducts a sample-and-hold operation at the end of the period for output 1, and therefore outputs level SH1 of FIG. 12, and S/H circuit 43 performs a sample-and-hold operation at the end of the period for output 2 and therefore outputs level SH2 of FIG. 12.

Signals SH1 and SH2 are both input to an analog multiplexer 47, which responds to output select signal O/S at its selection input to select one of signals SH1 and SH2 and provide it to a comparator 49. In comparator 49, the selected signal is compared with signal BSW, representing the current in switch B, and the result is output as signal DIR. Analog multiplexer 47 is set up so that during the period for providing power to output 1 the comparator 49 receives signal SH2, and during the period for providing power to output 2 comparator 49 receives signal SH1. Accordingly, as the time period for one power output draws to an end, the comparator 49 is comparing the current flowing through switch B (and therefore the current in the inductor 33) with the current level which will be required for inductor 33 at the end of the forthcoming slew phase at the beginning of the time period for the next output. Signal DIR, output by comparator 49, is high or low depending on which input to the comparator 49 is higher, so that the value of DIR at the end of the period for a power output indicates the direction in which current in the inductor 33 needs to change during the forthcoming slew phase (i.e. whether the slew phase should be phase AF or phase BC). Signal DIR is provided by the slew phase control unit 37 to the switch controller 39, which latches the value of DIR each time the period for supply to a power output ends, and returns the latched value as signal DIRO to the slew phase control unit 37.

Signals SH1 and SH2 are also input to another analog multiplexer 51, which also receives output select signal O/S at its selection input. However, the inputs to multiplexer 51 are reversed as compared with multiplexer 47, so that signal SH1 is supplied to input 1 of multiplexer 47 and input 0 of multiplexer 51, while signal SH2 is supplied to input 0 of multiplexer 47 and input 1 of multiplexer 51. Accordingly, whereas multiplexer 47 outputs the sample-and-hold value relevant to the next following power output period, multiplexer 51 outputs the sample-and-hold value relevant to the current power output period. Accordingly, during each slew phase multiplexer 51 outputs the sample-and-hold value which the current in inductor 33 is supposed to reach at the end of the slew phase.

Signals BSW, representing the current in switch B, and FSW, representing the current in switch F, are input to analog multiplexer 53. The selection input of multiplexer 53 receives latched direction signal DIRO. During a slew phase, signal DIRO indicates whether forward or reverse slew is required, with the result that multiplexer 53 outputs signal FSW during phase AF and signal BSW during phase BC.

The outputs of multiplexers 51 and 53 are supplied to a comparator 55, with the result that during each slew phase the comparator 55 compares the actual current in the inductor 33 (represented by FSW or BSW) with the target current (represented by SH1 or SH2). During forward slew phase AF, signal FSW is initially below the target value and the output from comparator 55 will be low. The comparator output will go high when the current in inductor 33 has reached the target value. Conversely, during reverse slew phase BC, signal BSW is initially higher than the target value so that the output of the comparator 55 is initially high, and the comparator output will go low when the current in inductor 33 reaches the target value. In order to provide a signal which always changes in the same direction when the target inductor current value is reached, the output of comparator 55 and the latched direction signal DIRO are input to an exclusive-OR gate 57. The output of XOR gate 57 is supplied as signal TS to the switch controller 39 in FIG. 14. Since signal DIRO is low for phase AF and high for phase BC, signal TS will initially be low during each slew phase, and will turn high when the current in inductor 33 reaches the required value. Accordingly, switch controller 39 responds to signal TS by terminating the slew phase and beginning the inductor charge phase.

Turning to FIG. 14, the functions of the switch controller 39 will now be discussed. During the operation cycle of the converter, each power output is allocated one cycle of clock signal CLK. Accordingly, the rising edge of signal CLK causes switch controller 39 to terminate the period for supplying one power output and begin the period for supplying the other. At this point, it latches the value of signal DIR received from the slew phase control unit 37, and returns the latched value DIRO to the slew phase control unit 37. The switch controller 39 changes the output select signal O/S, which indicates which power output is currently selected. Switch control signals CSA to CSF are changed to terminate the current phase and begin a slew phase. The switch controller 39 selects either forward slew phase AF or reverse slew phase BC depending on the value of signal DIR that is latched as DIRO at this time.

Depending on the time taken for the various signal changes to ripple through the relevant circuitry and take effect, it may be necessary to impose slight delays on some of the operations in the switch controller 39 at this point, in order to ensure correct operation. The change in the value of the output select signal O/S changes the sample-and-hold value output from analog multiplexer 47 to the comparator 49 in the slew phase control unit 37, which in turn affects the value of direction signal DIR. Therefore it is important that the value of DIR is latched as DIRO before the change in the value of O/S is able to affect DIR. Additionally, the operation of the switch control signals CSA to CSF, terminating the inductor discharge phase and initiating a slew phase, will change the current flowing through switch B. Accordingly, it is important that the changes in the positions of switches A to F does not take effect until the change in the value of the output select signal O/S has had time to cause the value of signal BSW to be re-sampled and held in the appropriate one of the sample-and-hold circuits 41, 43.

Switch controller 39 responds to the rising edge of signal TS by changing switch control signals CSA to CSF so as to terminate the slew phase and begin the inductor charge phase during which current flows from the input supply through switch A and the inductor 33 to the selected power output. Additionally, the switch controller 39 outputs a control signal GOSLOPE to the voltage regulation circuitry during the inductor charge phase but not during the slew phase or the inductor discharge phase. The switch controller 39 receives signals COMP1 and COMP2 from the voltage regulation circuitry in FIG. 15. These signals indicate whether the current in the inductor 33 has reached the peak current level required for supply to power output 1 (in the case of COMP1) or power output 2 (in the case of COMP2). The switch controller 39 responds to the rising edge of the appropriate one of COMP1 and COMP2 by changing the switch control signals CSA to CSF so as to open switch A and close switch B, thereby terminating the inductor charge phase and initiating the inductor discharge phase, in which current flows from earth through switch B and the inductor 33 to the selected output. The inductor discharge phase is terminated by the rising edge of clock signal CLK, which initiates the selection of the next power output and the switching to a slew phase, as discussed above.

The voltage regulation circuitry of FIG. 15 will now be discussed. The voltage regulation circuitry receives inputs VOUT1SEL and VOUT2SEL. These are 7-bit digital numbers representing the respective voltage levels required as the voltage Vout1 for power output 1 and Vout2 for power output 2. If the DC-to-DC converter is arranged to output certain specific voltages, the values of these 7-bit numbers may be hard-wired. Alternatively, an arrangement may be provided for inputting the numbers in order to provide a converter having programmable output voltages.

Each 7-bit number is used to set the resistance of a respective digitally programmable resistor R1A, R2A. Each digitally programmable resistor R1A, R2A is connected in series with a respective block PD1, PD2, and each respective series circuit is connected between ground and the respective power output, so as to receive the actual voltage Vout1, Vout2 provided at the respective power output. A respective signal VA1, VA2 is taken from the connection between the digitally programmable resistor and the associated block PD1, PD2. The signals VA1, VA2 are supplied to the inverting inputs of respective operational transconductance amplifiers Gm1, Gm2. A reference voltage Vref is connected to the non-inverting input of each operational transconductance amplifier Gm1, Gm2. The blocks PD1, PD2 may be resistors, current sources or other fixed components. They combine with the digitally programmable resistors to provide a potential divider or similar function, and the 7-bit digital control number is selected to set the resistance of the respective digitally programmable resistor R1A, R2A so that if the voltage Vout1, Vout2 of the respective power output is correct, the respective signal VA1, VA2 is equal to Vref. Consequently, any deviation of VA1 and VA2 from Vref represents an error in the respective power output voltage Vout1, Vout2. Operational transconductance amplifiers Gm1, Gm2 provide current output signals in accordance with the error difference between the respective input voltage signal VA1, VA2 and the reference voltage Vref. Reference voltage Vref may be generated in any convenient manner, normally a scaled bandgap voltage reference.

The current output signals from the operational transconductance amplifiers Gm1, Gm2 are filtered and converted to voltage signals VE1, VE2 by filter blocks Z1, Z2. These may, for example, be constructed entirely from passive elements. At the simplest conceptual level, a filter block Z1, Z2 may be a capacitance connected between ground and the output of the transconductance amplifier Gm1, Gm2, so that the voltage VE1, VE2 is the integral over time of the error current output from the transconductance amplifier Gm1, Gm2. The voltage error signal VE1, VE2 represents the peak level of the inductor current $I_L$ through the inductor 33, at which the inductor charge phase should end and the inductor discharge phase should begin during the period for delivering power to the respective power output. Since switch A is closed during the inductor charge phase, the current through switch A represents the inductor current at this time. Accordingly, the voltage signal ASW, representing the current through switch A, is compared with the voltage error signals VE1, VE2 in respective comparators VC1, VC2 to provide the signals COMP1, COMP2 which are supplied to the switch control circuit 35 for terminating the inductor charge phase. Initially the level of ASW is below the level of VE1 or VE2, and COMP1 or COMP2 is low. As soon as ASW rises above the level of VE1 or VE2, COMP1 or COMP2 goes high, and the switch control circuit 35 changes from the inductor charge phase to the inductor discharge phase.

So long as the power output voltages Vout1 and Vout2 are correct, signals VA1 and VA2 will equal Vref, and the current output from the operational transconductance amplifiers will be zero. Therefore the charge stored on the capacitances in the filters Z1 and Z2 will not change, the level of voltage signals VE1 and VE2 will not change, and the level of signal ASW at which control signals COMP1 and COMP2 go high will not change. If a change in current demand at one of the power outputs causes a change in the respective voltage Vout1 or Vout2, or if the 7-bit voltage control number VOUT1SEL or VOUT2SEL changes, the level of signal VA1 or VA2 will change, causing a non-zero current output from the transconductance amplifier Gm1 or Gm2. This is integrated by the capacitance in Z1 or Z2, causing a change in VE1 or VE2, and leading to a corresponding change in the level of ASW at which COMP1 or COMP2 goes high. This alters the peak inductor current at the end of the inductor charge phase, leading to an adjustment of the power provided to the relevant output as discussed above with reference to FIG. 12. The capacitance in Z1 and Z2 has the effect that the voltage error signal VE1, VE2 responds gradually to a step change in the current signal output by the respective operational transconductance amplifier Gm1, Gm2. As discussed with reference to FIG. 12, it may be useful to ensure that step changes in the power output voltages Vout1, Vout2 result in gradual changes in the error signals VE1, VE2.

In practice, filter blocks Z1 and Z2 may be contain other elements as well as or instead of the capacitances referred to above, in order to adjust the filtering characteristics. It is often necessary to modify the operation of voltage regulation circuitry in a DC-to-DC converter to provide what is known as "slope compensation". In the circuit of FIG. 15, slope compensation is performed by a slope compensation unit 59 which outputs a current signal to the line carrying the current from the means for monitoring current through switch A. This alters the current through resistor RASW so that the magnitude of voltage signal ASW is modified and does not solely represent the current through switch A. In this way, the necessary compensation can be applied to the operation of the voltage regulation circuitry. In order to ensure that the slope compensation unit 59 outputs the correct current signal, the 7-bit numbers VOUT1SEL, VOUT2SEL which control the digitally programmable resistors R1A, R2A, are also input to a multiplexer 61. Output select signal O/S controls multiplexer 61 so that a 7-bit digital output signal SLOPEBUS is the respective one of the input signals corresponding to the currently selected power output. The signal SLOPEBUS is input to the slope compensation unit 59 which is programmed to provide the appropriate output signal in accordance with the 7-bit binary digital input received. The slope compensation unit 59 is controlled by signal GOSLOPE output by the switch controller 39 in FIG. 14, so that the slope compensation signal is only applied to signal ASW during the inductor charge phase.

Accordingly, it can be seen that in the operation of the circuitry of FIG. 15, a variation in a power output voltage Vout1, Vout2 from its intended value will result in a variation in the respective one of signals VA1, VA2, resulting in a change in voltage error signal VE1 or VE2, which in turn changes the level of current in the inductor 33 at which signal COMP1 or COMP2 is output to terminate the inductor charge phase, thereby providing the voltage regulation operation described with reference to FIG. 12.

Figure 16:
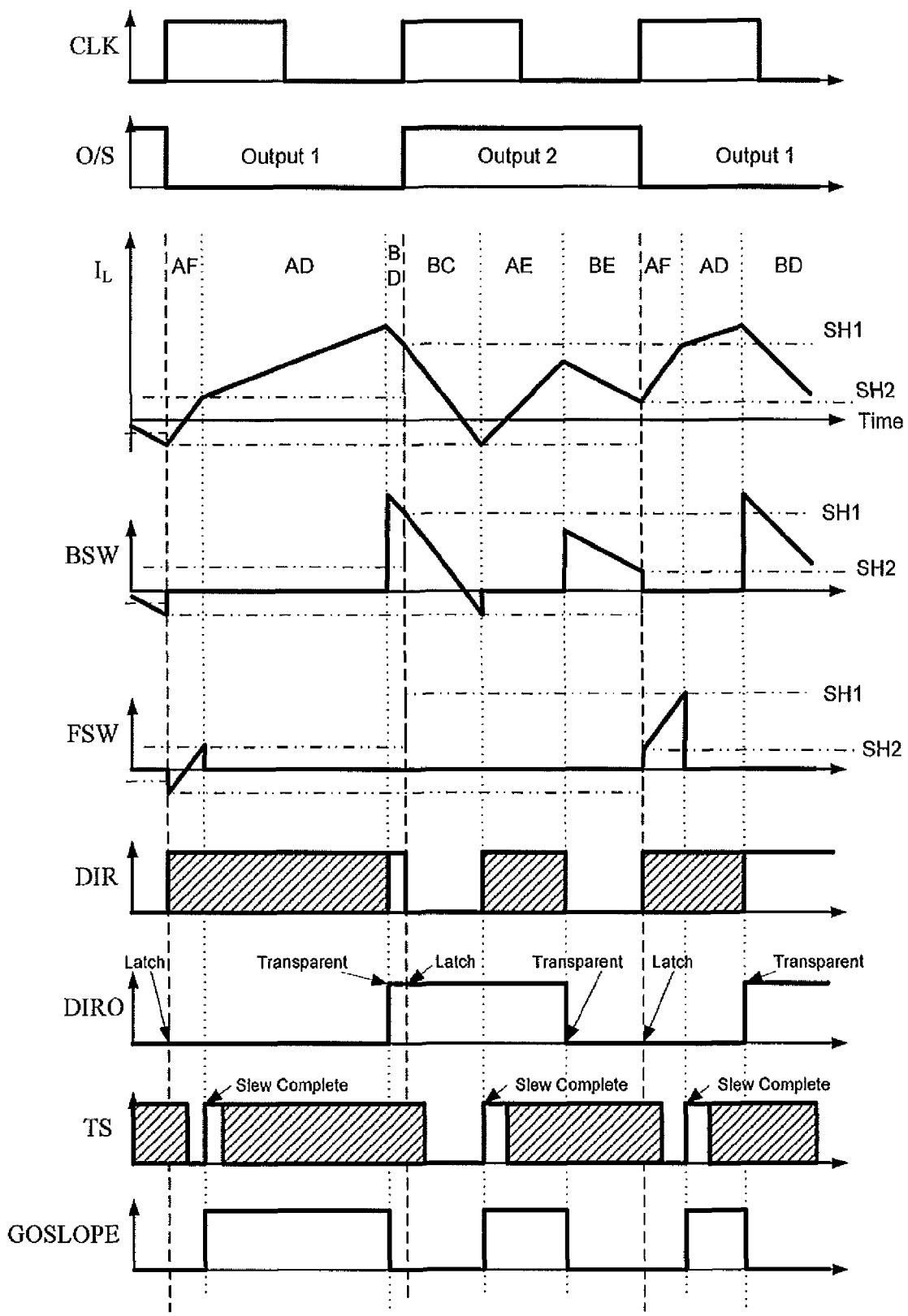
FIG. 16 is a timing diagram showing some of the signals used in the circuits of FIGS. 13, 14 and 15.

The behaviour of some of the signals used in the circuitry of FIGS. 13, 14 and 15 can be seen in FIG. 16. At the beginning of FIG. 16 an inductor discharge phase BE for output 2 is nearing its end. In this example, the current in the inductor 33 has fallen below zero (i.e. the current has reversed) so that both $I_L$ and BSW are negative and falling. The rising edge of clock CLK indicates the end of the period for output 2 and therefore the end of this phase BE. Since signal BSW is below the sample-and-hold value SH1 for the following output period, signal DIR is low. During the inductor discharge phase, signal DIRO is "transparent", that is to say it follows signal DIR. In response to the rising edge of CLK, DIRO is latched to preserve the direction information from signal DIR. The current value of signal BSW is sampled and held to provide the new value for SH2. Output select signal O/S falls, indicating the beginning of a period for power output 1, and a slew phase begins.

Because DIRO is low, indicating that the value of BSW (and therefore $I_L$) is below the required level SH1, a positive slew phase AF is selected by the switch controller 39. As the converter makes a transition from phase BE to phase AF, switch B opens and switch F closes. Accordingly, signal BSW immediately returns to zero, and signal FSW immediately drops in accordance with the negative value of the inductor current $I_L$. The signal changes ripple their way through multiplexers 51, 53, comparator 55 and XOR gate 57, and slew phase termination signal TS becomes valid. Initially, its value is low because signal FSW is below signal SH1. However, as slew phase AF continues, the inductor current rises and therefore signal FSW rises, until it reaches the level of SH1. At this point, signal TS goes high, indicating that the slew phase is complete. Switch controller 39 responds by terminating the slew phase AF and beginning the inductor charge phase AD. Switch F is opened, and therefore signal FSW immediately falls to zero.

During phases AF and AD, switch B is open and signal BSW is zero. Accordingly, direction signal DIR is not valid during these phases. Additionally, once the slew phase is completed and the inductor charge phase has begun, both switch B and switch F are open so that both signal BSW and FSW are zero, with the result that signal TS is not longer valid. The periods when signals DIR and TS are not valid are indicated by shading in FIG. 16.

Since phase AD is an inductor charge phase, signal GOSLOPE goes high during this phase, enabling the slope compensation unit 59 in the voltage regulation circuitry of FIG. 15. Phase AD continues, and inductor current $I_L$ rises, until the value of signal ASW in FIG. 15 reaches the value of VE1, at which point signal COMP1 (not shown in FIG. 16) is provided to the switch controller 39 which ends inductor charge phase AD and begins inductor discharge phase BD. Signal GOSLOPE falls, ending the slope compensation operation. Switch B closes and the value of BSW immediately changes to follow the inductor current $I_L$ which at this point is strongly positive. Signal DIR becomes valid, and because the current value of BSW is higher than the value of SH2 which will be used in the forthcoming period for output 2, DIR goes high to signal that a reverse slew phase will be needed. Signal DIRO enters its transparent phase, and accordingly rises to follow signal DIR.

Signal CLK rises again, indicating the end of the period for output 1 and the beginning of a period for output 2. Accordingly, DIRO is latched to record the value of DIR before it changes, the value of BSW at this time is sampled and held to provide the new value for signal SH1, signal O/S rises to indicate a period for output 2, and a slew phase begins. Because DIRO has been latched high, a reverse slew phase BC occurs. Accordingly, switch B remains open and switch F remains closed and in this slew phase signal BSW is valid and signal FSW is not. Signal TS becomes valid and remains low while the inductor current $I_L$ falls until signal BSW reaches the current value of signal SH2. At that point signal TS rises, indicating that the slew is complete. Switch controller 39 responds by ending the slew phase BC and beginning the inductor charge phase AE. Signal GOSLOPE rises in order to enable slope compensation. However, since signal O/S is now high, slope compensation appropriate for voltage Vout2 is applied, rather than slope compensation appropriate to voltage Vout1 which was applied during phase AD. Signal COMP2 from the voltage regulation circuitry of FIG. 15 triggers the end phase AE and the beginning of phase BE. Signal GOSLOPE falls and signal DIRO becomes transparent and follows signal DIR, which is now low because the value of BSW is less than the value of SH1 at this time. At the next rising edge of clock signal CLK, phase BE ends and the cycle begins again.

Figure 17:
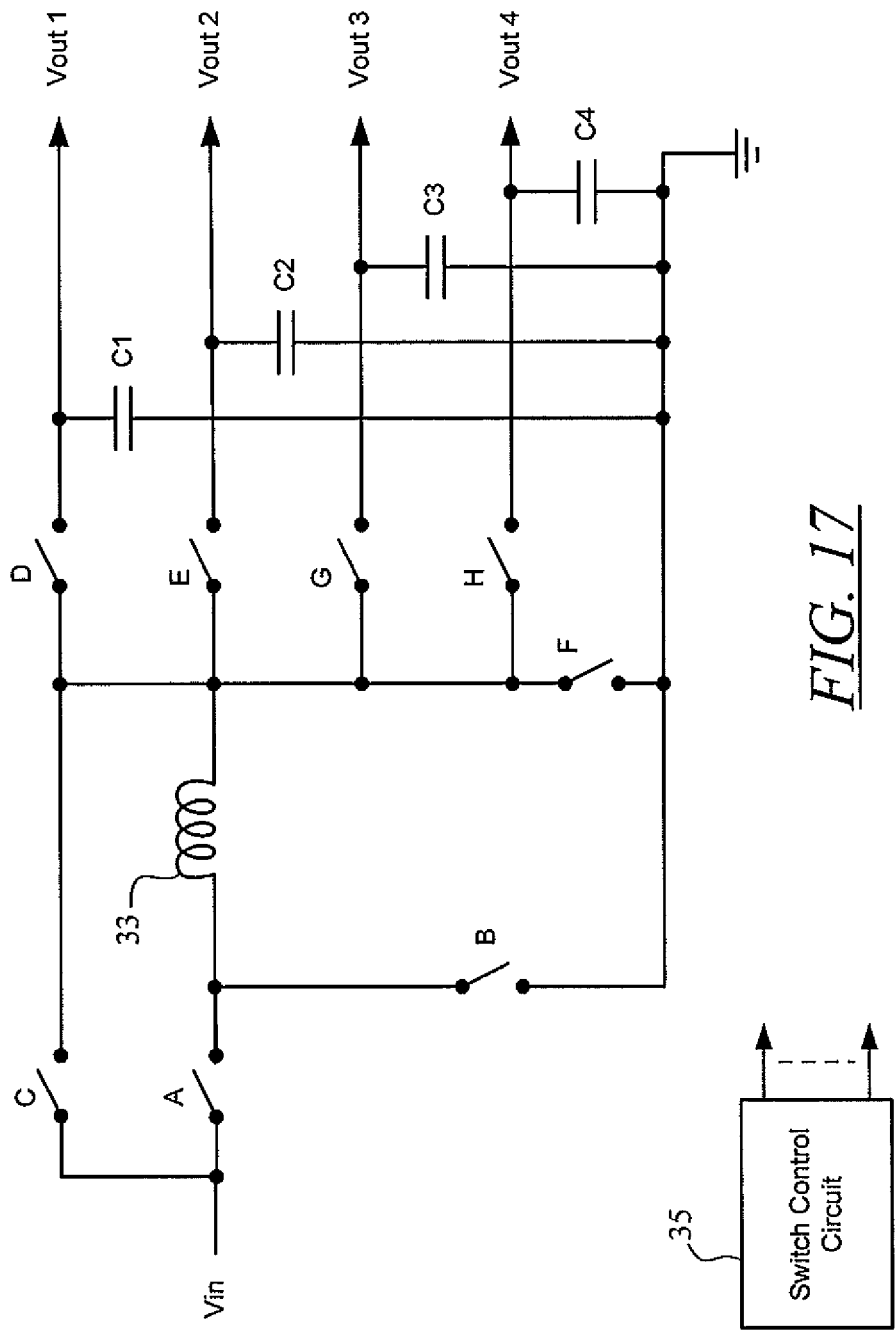
FIG. 17 is a circuit diagram, corresponding to FIG. 4, of the power conversion circuitry of a DC-to-DC converter according to another embodiment of the present invention.

For the sake of simplicity, FIGS. 4 to 16 relate to a converter circuit in which two power outputs are provided. However, the embodiment can easily be adapted to provide a greater number of outputs. FIG. 17 shows the circuit arrangement of the inductor and switch means for providing four power outputs. Additional switches G and H enable the right-hand side of the inductor 33 to be connected to new outputs 3 and 4 respectively.

When more than two power outputs are provided, the control circuitry and operation are substantially as previously described, but some modifications are required. First, the output select signal O/S can no longer be a single binary signal since there are more than two outputs. Accordingly, O/S becomes a multi-bit signal. In the slew phase control unit of FIG. 13, a separate sample-and-hold circuit needs to be provided for each power output. The inverter 45 needs to be replaced by a circuit for generating sample-and-hold control signals for each power output from the multi-bit output select signal O/S. Analog multiplexers 47 and 51 will need to have an input from each of the sample-and-hold circuits, and therefore will have more than two inputs, and will be arranged to select the appropriate input in accordance with the value of the multi-bit signal O/S. It is important to wire the inputs to multiplexer 51 so that it selects the SH value corresponding to the presently-selected power output indicated by signal O/S, and to wire multiplexer 47 so that it selects the SH value for the power output which will be selected next after the power output indicated by multi-bit signal O/S, in order that signals TS and DIR function correctly.

In FIG. 15, a 7-bit digital voltage selection input number would be provided for each power output, and a separate circuit comprising a digitally programmable resistor, PD block, transconductance amplifier, filter and comparator would be needed to generate a COMP signal for each power output. Multiplexer 61 would need to be modified in an analogous way to multiplexers 47 and 51, in order to select between more than two inputs and pass the appropriate 7-bit voltage selection number to the slope compensation unit 59 as signal SLOPEBUS.

Although the control system would normally be arranged to supply power to each power output in turn, it is possible that, where one power output has a much greater power demand than the others, the high-demand output might have more than one power supply period during each operation cycle. Thus, if there were three power outputs the cycle might have four power output periods, following the pattern "output 1, output 2, output 1, output 3,". Each output period would still be the same length, in accordance with the clock signal CLK, in order to minimize the amount of variable frequency noise.

If a large number of power outputs are provided, there may be choice in the order in which outputs appear in the operation cycle of the converter. In this case, it is advantageous to design the output cycle so that consecutive power outputs have similar sample-and-hold values so far as possible, and to avoid arrangements in which successive outputs alternate between high and low SH values, in order to avoid unnecessarily lengthy slew phases.

It should be noted that the present embodiment is merely an example, and many alternative arrangements are possible. The person skilled in the art will be able to devise alternative control circuit arrangements providing the correct functional operation. Variations in the operation of the control circuit are also possible. For example, at the end of the inductor discharge phase the current in the inductor (represented by signal BSW in the illustrated embodiment) may be compared with the current required at the beginning of the next inductor charge phase, and the slew phase may be skipped if the levels are close enough. Also, the slew phase may be ended once the inductor current becomes close enough to the required current, even if the exact value of the required current is not reached. The definition of "close enough" will be a matter for the judgement of the circuit designer with reference to the intended use of the power supply circuit. Alternative voltage regulation circuitry may be used instead of the arrangement shown in FIG. 15, and the skilled person will be familiar with a variety of ways in which slope compensation can be provided.

In principle, the converter control regime discussed with reference to FIGS. 11 and 12 can be implemented with a converter circuit in which switch C is omitted. In this case, the reverse slew phase would be provided by closing switches B and F, and allowing the current in the inductor to decay naturally. Alternatively, an arrangement might be provided for switching in a resistance, to help to dissipate the power stored in the inductor 33. However, this arrangement is not preferable for two reasons. First, it would normally take longer to reduce the inductor current in this way than by using switches C and B to connect the input voltage across the inductor in the reverse direction. Therefore either the cycle period of the converter has to be lengthened (increasing the level of ripple in the output voltages) or the proportion of the cycle period available for supplying power to the outputs is reduced. Second, in the absence of switch C it is not possible to drive the inductor current negative during a slew period. This means that such a circuit could not operate correctly with negative SH values. As has been shown in the examples discussed above, negative SH values can arise if one output has a much greater power demand than another. Accordingly, the absence of switch C would reduce the ability of the circuit to deliver power to multiple outputs having substantially different power demands.

Converter circuitry such as is shown in FIGS. 4 and 17, in which the input voltage may be connected across the inductor in either direction to ground (or another fixed voltage) can also be used with other control regimes. In the control regime described with reference to FIGS. 11 and 12, the supply of power to the outputs is discontinuous, in the sense that there are periods (the slew periods) during which power is not supplied to any output, even though current flow through the inductor is continuous. This type of circuit can also be used, for example, in a discontinuous current mode, in which the current through the inductor 33 returns to zero between supplying current to each output. Additionally, the ability to build up current in the inductor during forward slew phase AF, before connecting the inductor to any power output, makes it possible to supply an output with power at a higher voltage than the input voltage Vin. This would require a different control regime, since if Vout1 is greater than Vin, the inductor current will reduce rather than increase during phase AD, so that the current at the end of slew phase AF has to be higher than the current supplied to output 1 at any other time. Nevertheless, the ability to provide both positive and negative slew phases with circuitry of this type is anticipated to be useful for providing a DC-to-DC converter which is able to supply multiple power outputs including both an output at a voltage above the input voltage and an output at a voltage below the input voltage. Those skilled in the art will be able to devise appropriate control regimes depending on the combination of output voltages required.

The present invention may be implemented in devices in which the DC-to-DC converter is provided on the same integrated circuit chip as digital and/or analog circuits to which it provides power, and may be used in circuits for the processing of audio signals, but these features are not essential. The present invention is not limited to the features of the present embodiments, and a wide variety of alternatives will be apparent to those skilled in the art.

The invention claimed is:

1. A method of controlling a dc-to-dc electric power supply circuit in which the current through an inductor is used to supply electric power to respective ones of a plurality of outputs during successive respective time periods,
the method comprising:
(i) in at least some of said time periods,
  (a) a current correction step; and
(ii) during each said time period:
  (b) a first power supply step during which electric power is supplied to the inductor from a dc power source and current from the inductor is supplied to the respective output; and
  (c) a second power supply step, subsequent to the first power supply step, in which current from the inductor is supplied to the respective output while electric power is not supplied to the inductor, wherein:
in each of said time periods wherein a current correction step occurs, the first power supply step is subsequent to the current correction step;
the level of current in the inductor at the end of the second power supply step is detected and stored; and
the current correction step is a step in which the level of current in the inductor is altered in the direction to reduce the difference between the level of current in the inductor and the said stored level of current at the end of the second power supply step in the most recent previous said time period for the same output.

2. A method according to claim 1 in which the current correction step is carried out in all of said time periods.

3. A method according to claim 2 in which the current correction step is continued until a predetermined criterion is met.

4. A method according to claim 3 in which the predetermined criterion is either (i) that the levels of current are substantially the same or (ii) that the difference between the levels of current is within a preset limit.

5. A method according to claim 1 in which:
in respect of each said time period, the said stored level of current from the most recent previous said time period for the same output is compared with the level of current in the inductor at a time before the beginning of the first power supply step; and
the current correction step is carried out in the case that the result of the comparison does not meet a predetermined criterion.

6. A method according to claim 5 in which the current correction step is continued until the predetermined criterion is met.

7. A method according to claim 5 in which the predetermined criterion is either (i) that the levels of current are substantially the same or (ii) that the difference between the levels of current is within a preset limit.

8. A method according to claim 1 in which the level of current in the inductor is altered in the current correction step by applying a voltage across the inductor from a power source external to the said dc-to-dc electric power supply circuit.

9. A method according to claim 8 in which the same power source is used in the first power supply step and in the current correction step.

10. A method according to claim 1 in which each said time period is of same duration, regardless of which one of the said plurality of outputs the respective said time period relates to.

11. A method according to claim 1 which comprises continuously repeating an operation cycle comprising a continuous succession of said time periods, each operation cycle containing at least one said time period in respect of each of the said plurality of outputs.

12. A method according to claim 11 in which each said cycle contains only one said time period in respect of each of the plurality of outputs.

13. A method according to claim 1 which comprises controlling the length of the said first power supply step in accordance with the difference between the actual value of the voltage at the respective output and a target value for the said voltage.

14. A control circuit for a dc-to-dc electric power supply circuit, arranged to perform a method according to claim 1.

15. A dc-to-dc electric power supply circuit comprising a control circuit according to claim 13 and arranged to perform a method according to claim 1.

16. A dc-to-dc electric power supply circuit comprising:
an inductor;
a plurality of outputs;
an input for receiving electric power from a dc power source;
a switching arrangement for selectively connecting the input to the inductor and disconnecting the input therefrom, and for selectively connecting the inductor to respective ones of the outputs at respective times and disconnecting the inductor therefrom;
a detecting arrangement for detecting the level of current in the inductor; and
control circuitry for receiving the detected level from the detecting arrangement and for controlling the switching arrangement,
the control circuitry being arranged to control the switching arrangement so that the current through the inductor is supplied to respective ones of the plurality of outputs during successive respective time periods, at least some of said time periods comprising a current correction phase and each said time period comprising a first power supply phase and a second power supply phase subsequent to the first power supply phase, and in each of said time periods that comprises a current correction phase, the first power supply phase is subsequent to the current correction phase:
wherein
the control circuitry is arranged to store the level of current in the inductor detected by the detecting arrangement at the end of the second power supply phase and
(a) the control circuitry is arranged to control the switching arrangement during the current correction phase so as to alter the level of current in the inductor in the direction to reduce the difference between the level of current in the inductor and the said stored level of the current detected at the end of the second power supply phase in the most recent previous said time period for the same output,
(b) the control circuitry is arranged to control the switching arrangement during the first power supply phase to connect the input to the inductor to supply electric power to the inductor from a dc power source, and to connect the inductor to the respective output so as to supply current from the inductor to the respective output, and
(c) the control circuitry is arranged to control the switching arrangement during the second power supply phase to connect the inductor to the respective output so as to supply current from the inductor to the respective output and to disconnect the input from the inductor so that electric power is not supplied to the inductor.

17. A dc-to-dc electric power supply circuit according to claim 16 in which the control circuitry is arranged to provide the current correction phase in all of said time periods.

18. A dc-to-dc electric power supply circuit according to claim 17 in which the control circuitry is arranged to maintain the current correction phase until a predetermined criterion is met.

19. A dc-to-dc electric power supply circuit according to claim 18 in which the predetermined criterion is either (i) that the levels of current are substantially the same or (ii) that the difference between the levels of current is within a preset limit.

20. A dc-to-dc electric power supply circuit according to claim 16 in which the control circuitry is arranged to compare, in respect of each said time period, the detected level of current in the inductor at a time before the beginning of the first power supply phase with the said stored level of current from the most recent previous said time period for the same output, and to control the switching arrangement to provide the current correction phase in the circumstance that the result of the comparison does not meet a predetermined criterion.

21. A dc-to-dc electric power supply circuit according to claim 20 in which the control circuitry is arranged to maintain the current correction phase until the predetermined criterion is met.

22. A dc-to-dc electric power supply circuit according to claim 20 in which the predetermined criterion is either (i) that the levels of current are substantially the same or (ii) that the difference between the levels of current is within a preset limit.

23. A dc-to-dc electric power supply circuit according to claim 16 in which control circuitry is arranged to alter the level of current in the inductor in the current correction phase by controlling the switching arrangement to connect the input to the inductor so as to apply a voltage across the inductor from a power source connected to the input.

24. A dc-to-dc electric power supply circuit according to claim 16 in which the control circuitry is arranged to repeat continuously an operation cycle comprising a continuous succession of said time periods, each said time period being of same duration regardless of which one of the said plurality of outputs the respective said time period relates to, and in which each operation cycle contains at least one said time period in respect of each of the said plurality of outputs.

25. A dc-to-dc electric power supply circuit according to claim 24 in which each said cycle contains only one said time period in respect of each of the plurality of outputs.

26. A dc-to-dc electric power supply circuit according to claim 16 in which the control circuitry is arranged to control the duration of the said first power supply phase in accordance with the difference between the actual value of the voltage at the respective output and a target value for the said voltage.

27. An integrated circuit comprising:
the plurality of outputs, the input, the switching arrangement, the detecting arrangement and the control circuitry of a dc-to-dc electric power supply circuit according to claim 16, the input comprising connection terminals for connecting the integrated circuit to a source of dc power external to the integrated circuit; and
further connection terminals for connecting the integrated circuit to the said inductor of the dc-to-dc electric power supply circuit.

28. An integrated circuit according to claim 27 in which the integrated circuit comprises additional circuitry connected within the integrated circuit to receive electric power from at least one said output of the dc-to-dc electric power supply circuit.

29. An integrated circuit or an electric circuit device according to claim 28 in which the additional circuitry comprises both digital circuits and analog circuits.

30. An integrated circuit or an electric circuit device according to claim 28 in which the additional circuitry comprises circuits for processing audio signals.

31. An electric circuit device comprising a dc-to-dc electric power supply circuit according to claim 16, the plurality of outputs, the input, the switching arrangement, the detecting arrangement and the control circuitry being provided on an integrated circuit;
the input comprising connection terminals for connecting the integrated circuit to a source of dc power external to the integrated circuit;
the input comprising connection terminals for connecting the integrated circuit to a source of dc power external to the integrated circuit;

the integrated circuit comprising further connection terminals; and the inductor being connected to the further connection terminals.

32. A device for recording and/or reproducing at least one of video and audio signals, comprising a dc-to-dc electric power supply circuit according to claim 16, the device comprising at least one of (i) a connection for receiving an electric battery, to act as the said external source, and (ii) a connection terminal for receiving a removable connection to an external device, to act as the said external source, and the device comprising at least one of (iii) a display, (iv) an connection terminal for receiving a removable connection to an external display, (v) an audio transducer, and (vi) a connection terminal for receiving a removable connection to an external audio transducer.

33. A dc-to-dc electric power supply circuit comprising:
an inductor;
a plurality of outputs;
an input for receiving electric power from a power source;
a switching arrangement for selectively connecting the input to the inductor and disconnecting the input therefrom, and for selectively connecting the inductor to respective ones of the outputs at respective times and disconnecting the inductor therefrom;

a detecting arrangement for detecting the level of current in the inductor; and control circuitry for receiving the detected level from the detecting arrangement and for controlling the switching arrangement, the control circuitry being arranged to compare the detected level of current in the inductor at a time before current is supplied to one of the said outputs with the level of current that was detected in the inductor at the end of the most recent previous period of time when current was supplied to the same one of the said outputs, and to control the switching arrangement at least partially in response to the result of the comparison.

34. An integrated circuit comprising:

the plurality of outputs, the input, the switching arrangement, the detecting arrangement and the control circuitry of a dc-to-dc electric power supply circuit according to claim 33, the input comprising connection terminals for connecting the integrated circuit to a source of dc power external to the integrated circuit; and further connection terminals for connecting the integrated circuit to the said inductor of the dc-to-dc electric power supply circuit.

* * * * *